(12) United States Patent
Gao et al.

(10) Patent No.: US 11,290,311 B2
(45) Date of Patent: Mar. 29, 2022

(54) METHOD AND APPARATUS FOR REFERENCE SIGNAL CONFIGURATION

(71) Applicant: NEC CORPORATION, Tokyo (JP)

(72) Inventors: Yukai Gao, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/635,840

(22) PCT Filed: Aug. 3, 2017

(86) PCT No.: PCT/CN2017/095872
§ 371 (c)(1),
(2) Date: Jan. 31, 2020

(87) PCT Pub. No.: WO2019/024055
PCT Pub. Date: Feb. 7, 2019

(65) Prior Publication Data
US 2021/0135922 A1    May 6, 2021

(51) Int. Cl.
*H04L 5/00* (2006.01)
*H04L 27/26* (2006.01)

(52) U.S. Cl.
CPC ...... *H04L 27/26136* (2021.01); *H04L 5/0048* (2013.01); *H04L 27/2607* (2013.01)

(58) Field of Classification Search
CPC ... H04L 5/0048; H04L 27/26; H04L 27/2613; H04L 27/2611; H04L 27/06; H04L 27/2614

(Continued)

(56) References Cited

U.S. PATENT DOCUMENTS

2012/0300728 A1  11/2012 Lee et al.
2015/0009937 A1* 1/2015 Li ................ H04W 72/042
                                        370/329

(Continued)

FOREIGN PATENT DOCUMENTS

CN    103763071 A    4/2014
CN    103997722 A    8/2014

(Continued)

OTHER PUBLICATIONS

Written Opinion for PCT/CN2017/095872, dated Mar. 27, 2018.

(Continued)

*Primary Examiner* — Emmanuel Bayard
(74) *Attorney, Agent, or Firm* — Sughrue Mion, PLLC

(57) ABSTRACT

Methods and an apparatus for reference signal (RS) configuration. A method implemented in a network device is provided in which a plurality of reference signal (RS) ports to be used for RS transmission are determined based on at least one of different RS configuration patterns, different port multiplexing types and different number of symbols to be used for RS transmission. Each of the plurality of RS ports is indexed with a respective port index and at least two of the plurality of RS ports share a same port index. A plurality of RS configurations are determined at least based on the plurality of RS ports. In addition, at least one RS configuration from the plurality of RS configurations is allocated for a terminal device served by the network device. The at least one RS configuration indicates at least one RS port to be used for RS transmission.

12 Claims, 9 Drawing Sheets

(58) Field of Classification Search
USPC .............. 375/219, 260, 267, 299, 340, 329
See application file for complete search history.

(56) References Cited

U.S. PATENT DOCUMENTS

| | | | | |
|---|---|---|---|---|
| 2015/0280876 | A1* | 10/2015 | You | H04L 1/08 370/329 |
| 2015/0326362 | A1* | 11/2015 | Xiong | H04L 5/0048 370/336 |
| 2015/0373694 | A1* | 12/2015 | You | H04L 5/0094 370/329 |
| 2015/0381395 | A1* | 12/2015 | Guo | H04L 5/0014 370/329 |
| 2016/0100398 | A1* | 4/2016 | Xia | H04W 72/0413 370/330 |
| 2016/0212746 | A1* | 7/2016 | Wang | H04B 7/0452 |
| 2017/0317794 | A1* | 11/2017 | You | H04L 5/0051 |
| 2018/0376495 | A1* | 12/2018 | Lee | H04L 5/00 |
| 2019/0053270 | A1* | 2/2019 | Akoum | H04W 72/046 |
| 2019/0199477 | A1* | 6/2019 | Park | H04L 1/0693 |
| 2020/0119850 | A1* | 4/2020 | Gao | H04L 1/0643 |
| 2020/0204335 | A1* | 6/2020 | Kim | H04L 27/261 |

FOREIGN PATENT DOCUMENTS

| | | |
|---|---|---|
| CN | 106559199 A | 4/2017 |
| EP | 3651398 A1 | 5/2020 |
| WO | 2016/127309 A1 | 8/2016 |

OTHER PUBLICATIONS

International Search Report for PCT/CN2017/095872, dated Mar. 27, 2018.
ZTE, "DMRS design considerations in grant-free transmission", 3GPP TSG RAN WG1 Meeting #89, R1-1707053, May 15-19, 2017, (4 pages total).
CATT, "Discussion on DMRS design for UL", 3GPP TSG RAN WG1 Meeting #88bis, R1-1707488, May 15-19, 2017, (6 pages total).
Communication dated Jul. 3, 2020, from the European Patent Office in application No. 17920170.2.
Communication dated Apr. 6, 2021 from the Japanese Patent Office in Application No. 2020-505455.
Communication dated Feb. 25, 2021 from the Indian Intellectual Property Office in Application No. 202017008577.
VIVO, "On DL DMRS design for NR", 3GPP TSG RAN WG1 Meeting #89, R1-1707274, May 15-19, 2017, (5 pages total).
NTT Docomo, Inc., "Views on DM-RS", 3GPP TSG RAN WG1 Meeting #89, R1-1708459, Hangzhou, P. R. China, May 15-19, 2017, pp. 1-5 (6 pages total).
Decision of Refusal dated Nov. 16, 2021 from the Japanese Patent Office in JP Application No. 2020-505455.

* cited by examiner

US 11,290,311 B2

METHOD AND APPARATUS FOR REFERENCE SIGNAL CONFIGURATION

CROSS REFERENCE TO RELATED APPLICATIONS

This application is a National Stage of International Application No. PCT/CN2017/095872 filed Aug. 3, 2017.

TECHNICAL FIELD

Embodiments of the present disclosure generally relate to the field of telecommunication, and in particular, to a method and an apparatus for reference signal (RS) configuration.

BACKGROUND

With the development of communication technologies, multiple types of services or traffic have been proposed, for example, enhanced mobile broadband (eMBB) generally requiring high data rate, massive machine type communication (mMTC) typically requiring long battery lifetime, and ultra-reliable and low latency communication (URLLC). Meanwhile, multi-antenna schemes, such as beam management, reference signal transmission, and so on, are studied for new radio access.

Conventionally, a network device (for example, an eNB or a gNB) may transmit downlink reference signals (RSs) such as Demodulation Reference Signal (DMRS), Channel State Information-Reference Signal (CSI-RS), Sounding Reference Signal (SRS), Phase Tracking Reference Signal (PTRS), fine time and frequency Tracking Reference Signal (TRS) and the like. A terminal device (for example, a user equipment) in the system may receive the downlink RSs on allocated resources. The terminal device may also transmit uplink RSs to the network device on corresponding allocated resources. For indicating the allocated resources and/or other necessary information for the RSs, the network device may transmit RS configurations to the terminal device prior to the transmissions of the RSs.

For example, two configuration patterns for DMRS have been designed and agreed in 3GPP specification works, each of which may support up to 8 or 12 orthogonal DMRS ports. Different DMRS ports may be multiplexed based on Code Division Multiplexing (CDM) technology in frequency domain, or based on Frequency Division Multiplexing (FDM) technology and/or CDM technology in time domain. DMRS ports may be divided into groups. DMRS port groups belonging to one physical downlink shared channel (PDSCH) may have different Quasi-Co-Location (QCL) assumptions. All of the above may result in complexity for a network device to indicate a DMRS configuration to a terminal device. In this case, a scheme for dynamic DMRS configuration with less signaling overhead needs to be considered.

SUMMARY

In general, example embodiments of the present disclosure provide a method and an apparatus for RS configuration.

In a first aspect, there is provided a method implemented in a network device. According to the method, a plurality of reference signal (RS) ports to be used for RS transmission are determined based on at least one of different RS configuration patterns, different port multiplexing types and different number of symbols to be used for RS transmission. Each of the plurality of RS ports is indexed with a respective port index and at least two of the plurality of RS ports share a same port index. A plurality of RS configurations are determined at least based on the plurality of RS ports. In addition, at least one RS configuration from the plurality of RS configurations is allocated for a terminal device served by the network device. The at least one RS configuration indicates at least one RS port to be used for RS transmission.

In a second aspect, there is provided a network device. The network device comprises a processor and a memory coupled to the processor. The memory stores instructions that when executed by the processor, cause the network device to performs actions. The actions comprise: determining a plurality of reference signal (RS) ports to be used for RS transmission based on at least one of different RS configuration patterns, different port multiplexing types and different number of symbols to be used for RS transmission, each of the plurality of RS ports being indexed with a respective port index and at least two of the plurality of RS ports sharing a same port index; determining a plurality of RS configurations at least based on the plurality of RS ports; and allocating at least one RS configuration from the plurality of RS configurations for a terminal device served by the network device, the at least one RS configuration indicating at least one RS port to be used for RS transmission.

Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
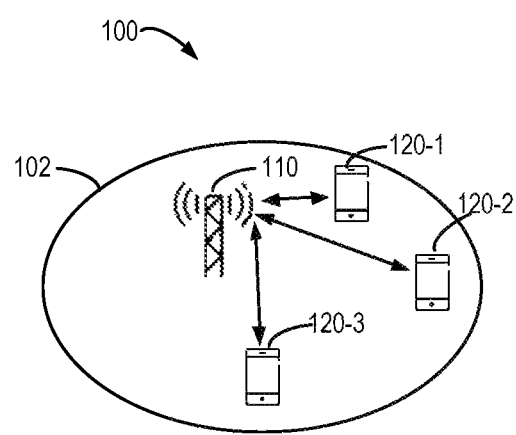
FIG. 1 is a block diagram of a communication environment in which embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "network device" or "base station" (BS) refers to a device which is capable of providing or hosting a cell or coverage where terminal devices can communicate. Examples of a network device include, but not limited to, a Node B (NodeB or NB), an Evolved NodeB (eNodeB or eNB), a next generation NodeB (gNB) a Remote Radio Unit (RRU), a radio head (RH), a remote radio head (RRH), a low power node such as a femto node, a pico node, and the like. For the purpose of discussion, in the following, some embodiments will be described with reference to gNB as examples of the network device.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, image capture devices such as digital cameras, gaming devices, music storage and playback appliances, or Internet appliances enabling wireless or wired Internet access and browsing and the like. For the purpose of discussion, in the following, some embodiments will be described with reference to UE as examples of the terminal device.

As used herein, the singular forms "a", "an" and "the" are intended to include the plural forms as well, unless the context clearly indicates otherwise. The term "includes" and its variants are to be read as open terms that mean "includes, but is not limited to." The term "based on" is to be read as "at least in part based on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below.

In some examples, values, procedures, or apparatus are referred to as "best," "lowest," "highest," "minimum," "maximum," or the like. It will be appreciated that such descriptions are intended to indicate that a selection among many used functional alternatives can be made, and such selections need not be better, smaller, higher, or otherwise preferable to other selections.

Communication discussed in the present disclosure may conform to any suitable standards including, but not limited to, New Radio Access (NR), Long Term Evolution (LTE), LTE-Evolution, LTE-Advanced (LTE-A), Wideband Code Division Multiple Access (WCDMA), Code Division Multiple Access (CDMA) and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

FIG. 1 shows an example communication network 100 in which embodiments of the present disclosure can be implemented. The network 100 includes a network device 110 and three terminal devices 120-1 and 120-3 (collectively referred to as terminal devices 120 or individually referred to as terminal device 120) served by the network device 110. The coverage of the network device 110 is also called as a cell 102. It is to be understood that the number of base stations and terminal devices is only for the purpose of illustration without suggesting any limitations. The network 100 may include any suitable number of base stations and the terminal devices adapted for implementing embodiments of the present disclosure. Although not shown, it would be appreciated that there may be one or more neighboring cells adjacent to the cell 102 where one or more corresponding network devices provides service for a number of terminal device located therein.

The network device 110 may communicate with the terminal devices 120. The communications in the network 100 may conform to any suitable standards including, but not limited to, Long Term Evolution (LTE), LTE-Evolution, LTE-Advanced (LTE-A), Wideband Code Division Multiple Access (WCDMA), Code Division Multiple Access (CDMA) and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

In addition to normal data communications, the network device 110 may send a RS in a broadcast, multi-cast, and/or unicast manners to one or more of the terminal devices 120 in a downlink. Similarly, one or more of the terminal devices 120 may transmit RSs to the network device 110 in an uplink. As used herein, a "downlink" refers to a link from a network device to a terminal device, while an "uplink" refers to a link from the terminal device to the network device. For the purpose of discussion without suggesting any limitations, in the following description, some embodiments will be described with reference to the downlink RS transmission.

For example, in the case of downlink RS transmission, the RS may be used by the terminal devices 120 for beam sweeping, channel estimation, demodulation, and other operations for communication. Generally speaking, a RS is a signal sequence (also referred to as "RS sequence") that is known by both the network device 110 and the terminal devices 120. For example, a RS sequence may be generated and transmitted by the network device 110 based on a certain rule and the terminal device 120 may deduce the RS sequence based on the same rule. Examples of the RS may include but are not limited to downlink or uplink Demodulation Reference Signal (DMRS), Channel State Information-Reference Signal (CSI-RS), Sounding Reference Signal (SRS), Phase Tracking Reference Signal (PTRS), fine time and frequency Tracking Reference Signal (TRS) and so on. For the purpose of discussion without suggesting any limitations, in the following description, some embodiments will be described with reference to DMRS as examples of the RS.

In transmission of downlink and uplink RSs, the network device 110 may allocate corresponding resources (also referred to as "RS resources") for the transmission and/or specify which RS sequence is to be transmitted. In some scenarios, both the network device 110 and the terminal device 120 are equipped with multiple antenna ports (or antenna elements) and can transmit specified RS sequences with the antenna ports (antenna elements). A set of RS resources associated with a number of RS ports are also specified. A RS port may be referred to as a specific mapping of part or all of a RS sequence to one or more resource elements (REs) of a resource region allocated for RS transmission in time, frequency, and/or code domains. Such resource allocation information may be indicated to the terminal device 120 prior to the transmission of the RSs.

As described above, two configuration patterns for DMRS have been designed and agreed in 3GPP specification works, each of which may support up to 8 or 12 orthogonal DMRS ports. However, in a current solution for DMRS configuration in LTE, only a fixed number of bits in DCI are supported for indicating the DMRS configuration (such as, antenna port(s), scrambling identity, the number of RS transmission layers and a RS configuration pattern, to be used for RS transmission), without considering different conditions.

Different DMRS ports may be multiplexed based on Code Division Multiplexing (CDM) technology in frequency domain, and/or based on Frequency Division Multiplexing (FDM) technology and/or CDM technology in time domain. However, how to configure the DMRS ports and which domain to be selected for a specific scenario are unclear in the current solution for DMRS configuration. In addition, some other factors such as power offset issues as well as cyclic shift design are not considered in the current solution for DMRS configuration.

In order to solve the problems above and one or more of other potential problems, a solution for DMRS configuration is provided in accordance with example embodiments of the present disclosure. With the solution, the signaling overhead for indicating the DMRS configuration can be reduced.

Figure 2:
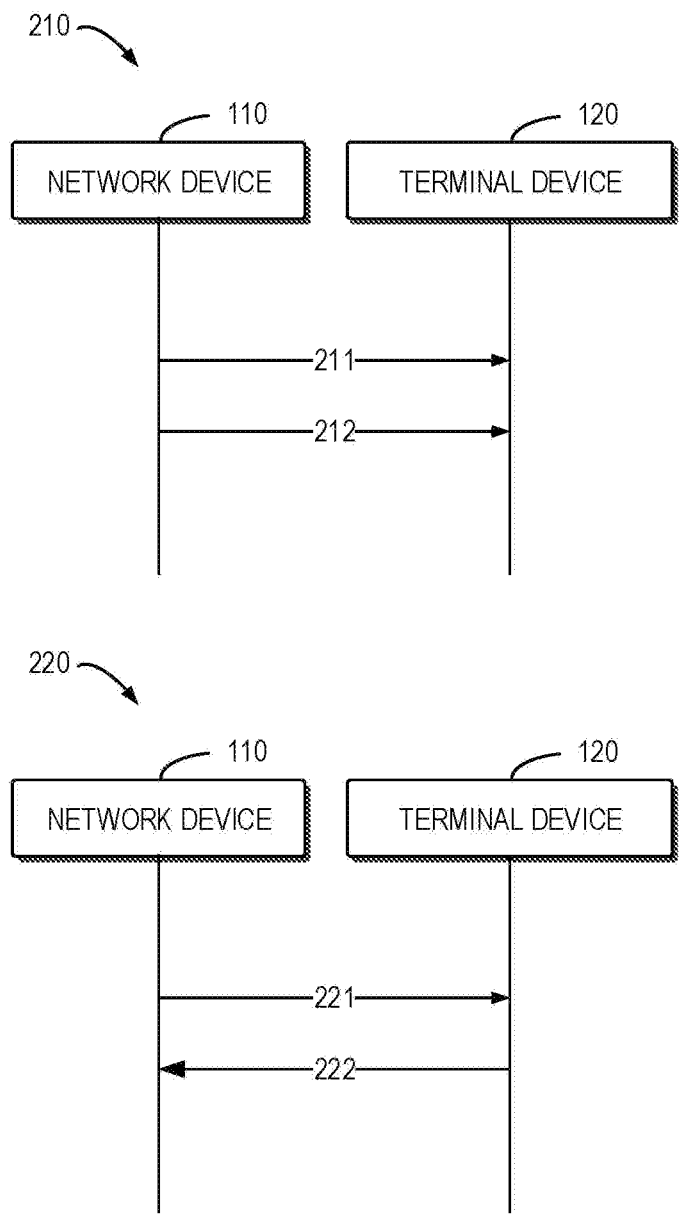
FIG. 2 illustrates processes for RS transmission according to some embodiments of the present disclosure.

Principle and implementations of the present disclosure will be described in detail below with reference to FIGS. 2-9, in which FIG. 2 shows two processes 210 and 220 for RS transmission according to some embodiments of the present disclosure. For the purpose of discussion, the processes 210 and 220 will be described with reference to FIG. 1. The processes 210 and 220 may involve the network device 110 and one or more terminal devices 120 served by the network device 110.

As shown in FIG. 2, the process 210 is directed to the case of downlink RS transmission. In one embodiment, the network device 110 may indicate (211) a RS configuration to a terminal device 120. The network device 120 may transmit (212) a RS based on the RS configuration. The terminal device 120 may receive the RS configuration from the network device 110, and detect the RS based on the received RS configuration. The process 220 is directed to the case of uplink RS transmission. In another embodiment, the network device 110 may indicate (221) a RS configuration to the terminal device 120. The terminal device 120 may receive from the network device 110 the RS configuration, and may transmit (222) the RS based on the received RS configuration. The network device 110 may detect the RS based on the RS configuration.

Figure 3:
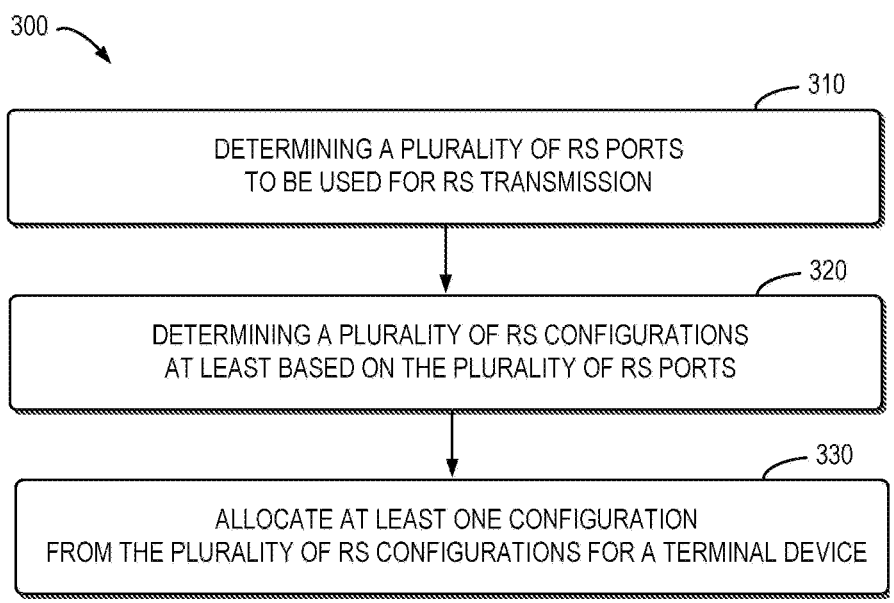
FIG. 3 shows a flowchart of an example method according to some embodiments of the present disclosure.

FIG. 3 shows a flowchart of an example method 300 for RS configuration according to some embodiments of the present disclosure. The method 300 can be implemented at the network device 110 as shown in FIG. 1. For the purpose of discussion, the method 300 will be described from the perspective of the network device 110 with reference to FIG. 1.

In act 310, the network device 110 determines a plurality of RS ports to be used for RS transmission, each of which may be indexed with a respective port index. In some embodiments, the plurality of RS ports may be determined based on at least one of different RS configuration patterns, different port multiplexing types and different number of symbols to be used for RS transmission.

As described above, two configuration patterns for DMRS have been designed and agreed in 3GPP specification works (RAN1 #89), each of which may support up to 8 or 12 orthogonal DMRS ports. One of the two configuration patters for DMRS is referred to as Interleaved Frequency Division Multiplexing (IFDM) based configuration pattern (that is, Front-load DMRS Configuration 1 as agreed in RAN1 #89), in which DMRS ports may be multiplexed based on FDM (such as different Comb offset values), CDM in frequency domain (such as different cyclic shift (CS) values) and/or CDM in time domain (such as different TD-OCCs). This pattern will be also referred to as "DMRS Configuration 1" in the following description.

Figure 4A:
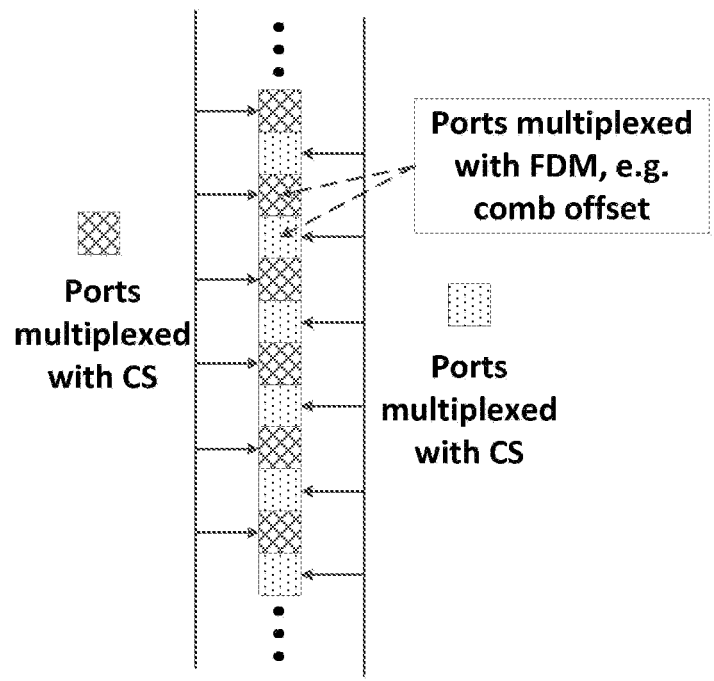
FIGS. 4A-4B shows examples of possible DMRS configurations according to some embodiments of the present disclosure.
Figure 4B:
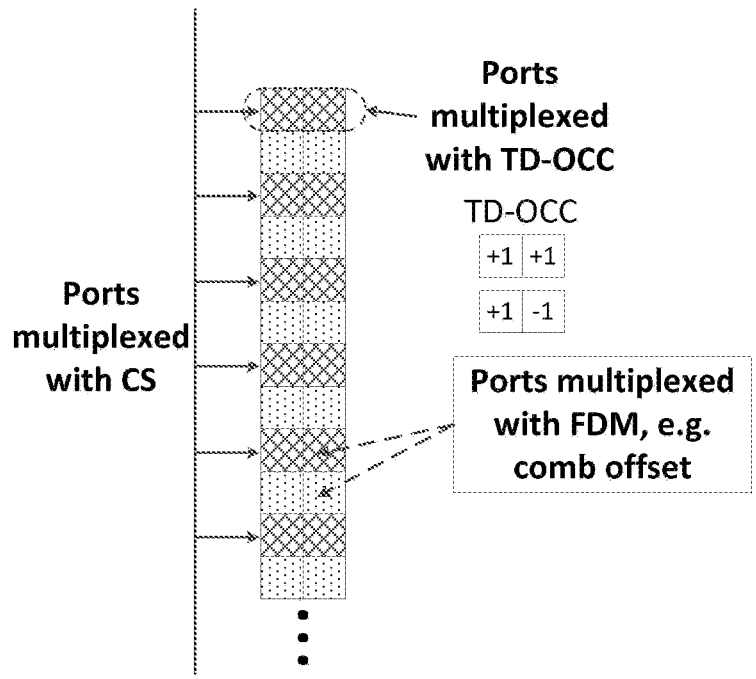

In some embodiments, for DMRS Configuration 1, one or two symbols can be supported for DMRS transmission. In one embodiment, for DMRS Configuration 1 associated with one symbol, DMRS ports may be multiplexed based on different Comb offset values and different CS values, and thus up to 4 DMRS ports can be supported. In another embodiment, for DMRS Configuration 1 associated with two symbols, DMRS ports may be multiplexed based on different Comb offset values, different CS values and different TD-OCCs, and thus up to 8 DMRS ports can be supported. FIGS. 4A and 4B show examples of DMRS Configuration 1 according to some embodiments of the present disclosure. In FIGS. 4A and 4B as well as the following FIGS. 5A-7B, each element may represent a RE in frequency domain and each column of elements may represent a symbol. FIG. 4A shows examples of DMRS Configuration 1 associated with one symbol. As shown in FIG. 4A, in some embodiments, some of the RS ports may be multiplexed based on CDM, such as different CS values. Further, some of the RS ports may be multiplexed based on FDM, such as different Comb offset values. FIG. 4B shows examples of DMRS Configuration 1 associated with two symbols. As shown in FIG. 4B, in some embodiments, some of the RS ports may be multiplexed based on CDM in frequency domain, such as different CS values. Some of the RS ports may be multiplexed based on FDM, such as different Comb offset values. Further, some of the RS ports may be multiplexed based on CDM in time domain, such as different TD-OCCs.

Figure 5A:
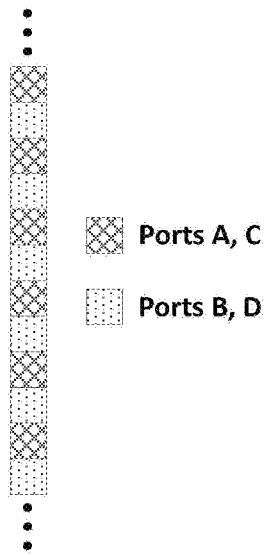
FIGS. 5A-5C shows examples of possible DMRS configurations according to some embodiments of the present disclosure.
Figure 5B:
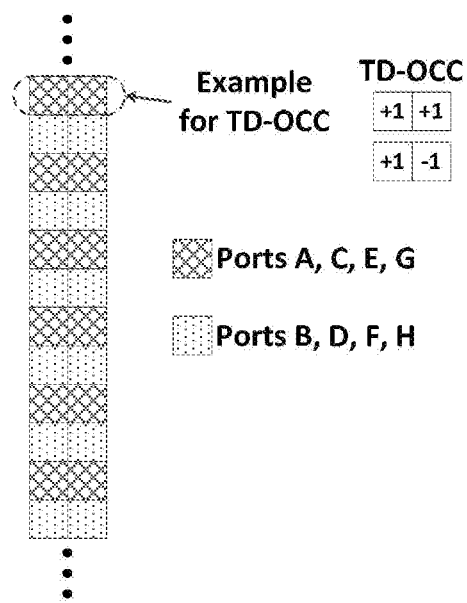

In some embodiments, for DMRS Configuration 1 associated with one symbol, up to 4 RS ports may be determined based on 2 Comb offset values and 2 CS values. That is, each RS port may be associated with a respective Comb offset value and a respective CS value. In some other embodiments, for DMRS Configuration 1 associated with two symbols, up to 8 RS ports may be determined based on 2 Comb offset values, 2 CS values and 2 TD-OCCs. That is, each RS port may be associated with a respective Comb offset value, a respective CS value and a respective TD-OCC. In some embodiments, the port indices for DMRS Configuration 1 associated with one symbol may be overlapped with some of the port indices for DMRS Configuration 1 associated with two symbols. Specifically, in one embodiment, two RS ports configured with a same CS value and a same Comb offset value may share a same port index. In this way, the number of indices of RS ports is reduced, and thus the overhead for indicating a RS configuration can be reduced. FIGS. 5A and 5B shows examples of such embodiments.

FIG. 5A shows examples for DMRS Configuration 1 associated with one symbol. FIG. 5A shows 4 RS ports, which are Ports A, B, C and D. Table 1 shows the detailed information associated with Ports A, B, C and D as shown in FIG. 5A. In one embodiment, for DMRS Configuration 1 associated with one symbol, TD-OCCs associated with Ports A, B, C and D may be unavailable as shown in Table 1. In another embodiment, for DMRS configuration 1 associated with one symbol, TD-OCC associated with each of Ports A, B, C and D may be {+1}. That is, the RS sequences for Ports A, B, C and D may be multiplied by applying HI on respective resource elements. In yet another embodiment, there may be no TD-OCC field for DMRS configuration 1 associated with one symbol. That is, the fourth column of Table 1 may not exist.

TABLE 1

| Port Index | Comb offset value | CS value | TD-OCC |
|---|---|---|---|
| Port A | b0 | c0 | N/A or {+1} |
| Port B | b1 | c0 | N/A or {+1} |
| Port C | b0 | c1 | N/A or {+1} |
| Port D | b1 | c1 | N/A or {+1} |

As shown in FIG. 5A and Table 1, Ports A and C are mapped into same RS resources and multiplexed based on CDM in frequency domain. For example, Ports A and C are configured with different CS values, in which Port A is associated with CS value c0 and port C is associated with CS value c1. Ports B and D are mapped into same RS resources and multiplexed based on CDM in frequency domain. For example, Ports B and D are configured with different CS values, in which Port B is associated with CS value c0 and port D is associated with CS value c1. Ports (A, C) and (B, D) are multiplexed based on FDM, such as different comb offset values. For example, as shown in FIG. 5A and Table 1, Ports (A, C) are associated with comb offset value b0, and Ports (B, D) are associated with comb offset value b1.

FIG. 5B shows examples for DMRS Configuration 1 associated with two symbols. FIG. 5B shows 8 RS ports, which are Ports A, B, C, D, E, F, G and H. Table 2 shows the detailed information associated with Ports A, B, C, D, E, F, G and H as shown in FIG. 5B.

TABLE 2

| Port Index | Comb offset value | CS value | TD-OCC |
|---|---|---|---|
| Port A | b0 | c0 | t0 (e.g. {1, 1}) |
| Port B | b1 | c0 | t0 (e.g. {1, 1}) |
| Port C | b0 | c1 | t0 (e.g. {1, 1}) |
| Port D | b1 | c1 | t0 (e.g. {1, 1}) |
| Port E | b0 | c0 | t1 (e.g. {1, −1}) |
| Port F | b1 | c0 | t1 (e.g. {1, −1}) |
| Port G | b0 | c1 | t1 (e.g. {1, −1}) |
| Port H | b1 | c1 | t1 (e.g. {1, −1}) |

As shown in FIG. 5B and Table 2, in one embodiment, Ports A and C are mapped into same RS resources and multiplexed based on CDM in frequency domain. For example, Ports A and C are configured with different CS values, in which Port A is associated with CS value c0 and port C is associated with CS value c1. In one embodiment, Ports B and D are mapped into same RS resources and multiplexed based on CDM in frequency domain. For example, Ports B and D are configured with different CS values, in which Port B is associated with CS value c0 and port D is associated with CS value c1. In one embodiment, Ports E and G are mapped into same RS resources and multiplexed based on CDM in frequency domain. For example, Ports E and G are configured with different CS values, in which Port E is associated with CS value c0 and port G is associated with CS value c1. In one embodiment, Ports F and H are mapped into same RS resources and multiplexed based on CDM in frequency domain. For example, Ports F and H are configured with different CS values, in which Port F is associated with CS value c0 and port H is associated with CS value c1.

In one embodiment, Ports (A, C) and (E, G) may be multiplexed based on CDM in time domain, such as different TD-OCCs. For example, Ports (A, C) and (E, G) are configured with different TD-OCCs, in which Ports (A, C) are associated with TD-OCC t0 and Ports (E, G) are associated with TD-OCC t1. In one embodiment, TD-OCC t0 may be {1, 1} applied to the 2 adjacent REs. As shown in FIG. 5B and Table 2, the 2 adjacent REs are located in the same position in frequency domain but in 2 different symbols. In one embodiment, TD-OCC t1 may be {1, −1} applied to the 2 adjacent REs, which is different from the value of to. In one embodiment, Ports (B, D) and (F, H) are multiplexed based on CDM in time domain, such as different TD-OCCs. For example, Ports (B, D) and (F, H) are configured with different TD-OCCs, in which Ports (B, D) are associated with TD-OCC t0 and Ports (F, H) are associated with TD-OCC t1. In one embodiment, TD-OCC t0 may be {1, 1} applied to the 2 adjacent REs. As shown in FIG. 5B, the 2 adjacent REs are located in the same position of frequency domain but in 2 different symbols. In one embodiment, TD-OCC t1 may be {1, −1} applied to the 2 adjacent REs, which is different from the value of t0.

In one embodiment, Ports (A, C, E, G) and (B, D, F, H) may be multiplexed based on FDM, such as different comb offset values. For example, Ports (A, C, E, G) and (B, D, F, H) are configured with different comb offset values, in which Ports (A, C, E, G) are associated with comb offset value b0 and Ports (B, D, F, H) are associated with associated with comb offset value b1.

It can be seen from Table 1 and Table 2 that, RS ports associated with a same Comb offset value and a same CS value may share a same port index. As such, the number of indices of RS ports can be reduced, thereby reducing the overhead for indicating a RS configuration.

The other of the two configuration patters for DMRS is referred to as Frequency Division-Orthogonal Covering Code (FD-OCC) based configuration pattern with adjacent REs in frequency domain (that is, Front-load DMRS Configuration 2 as agreed in RAN1 #89), in which DMRS ports may be multiplexed based on FDM (such as different RE locations), CDM in frequency domain (such as different FD-OCCs) and/or CDM in time domain (such as different TD-OCCs). This pattern will be also referred to as "DMRS Configuration 2" in the following description.

Figure 6A:
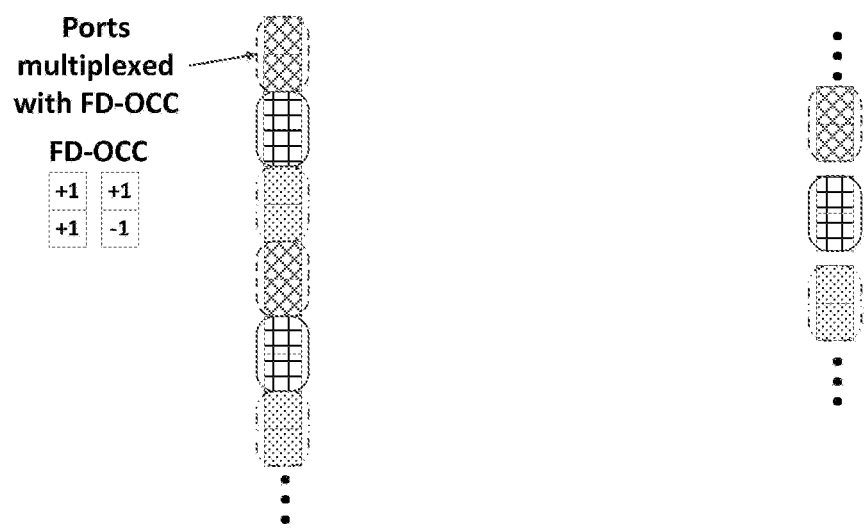
FIGS. 6A-6B shows examples of possible DMRS configurations according to some embodiments of the present disclosure.
Figure 6B:
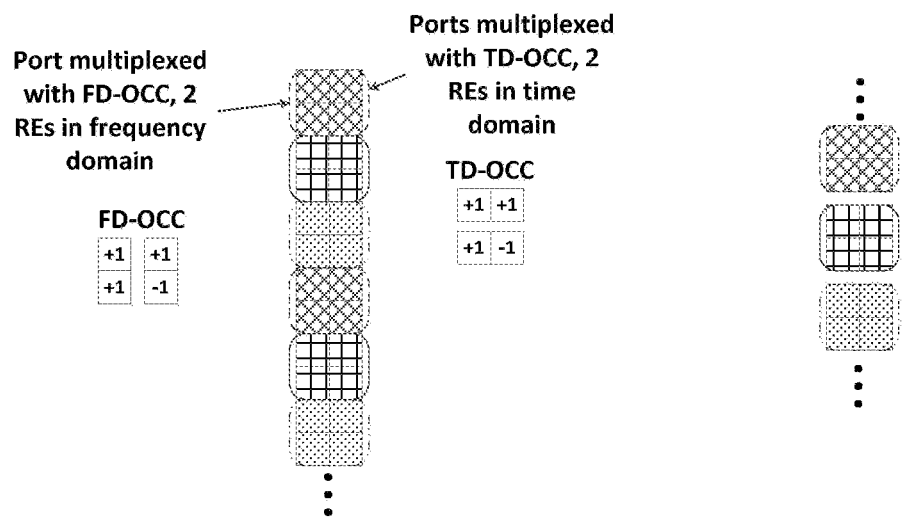

In some embodiments, for DMRS Configuration 2, one or two symbols can be supported for DMRS transmission. In one embodiment, for DMRS Configuration 2 associated with one symbol, DMRS ports may be multiplexed based on different FD-OCCs and different RE location values (for example, indicating different RE locations in frequency domain), and thus up to 6 DMRS ports can be supported. For DMRS Configuration 2 associated with two symbols, DMRS ports may be multiplexed based on different FD-OCCs, different RE location values and different TD-OCCs, and thus up to 12 DMRS ports can be supported. FIGS. 6A and 6B show examples of DMRS Configuration 2 according to some embodiments of the present disclosure. FIG. 6A shows examples of DMRS Configuration 2 associated with one symbol. As shown in FIG. 6A, in some embodiments, some of the RS ports may be multiplexed based on CDM in frequency domain, such as different FD-OCCs. Further, some of the RS ports may be multiplexed based on FDM, such as different RE location values. FIG. 6B shows examples of DMRS Configuration 2 associated with two symbols. As shown in FIG. 6B, in some embodiments, some of the RS ports may be multiplexed based on CDM in frequency domain, such as different FD-OCCs. Some of the RS ports may be multiplexed based on FDM, such as different RE location values. Further, some of the RS ports may be multiplexed based on CDM in time domain, such as different TD-OCCs.

Figure 7A:
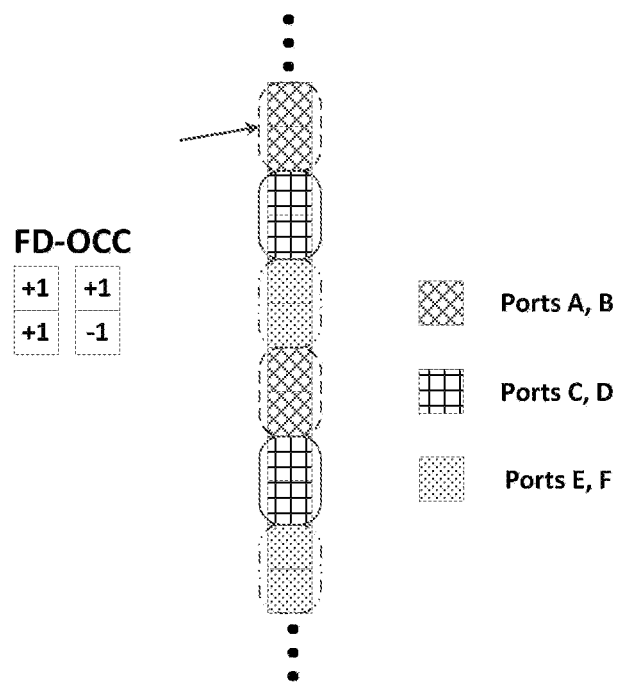
FIGS. 7A-7B shows examples of possible DMRS configurations according to some embodiments of the present disclosure.
Figure 7B:
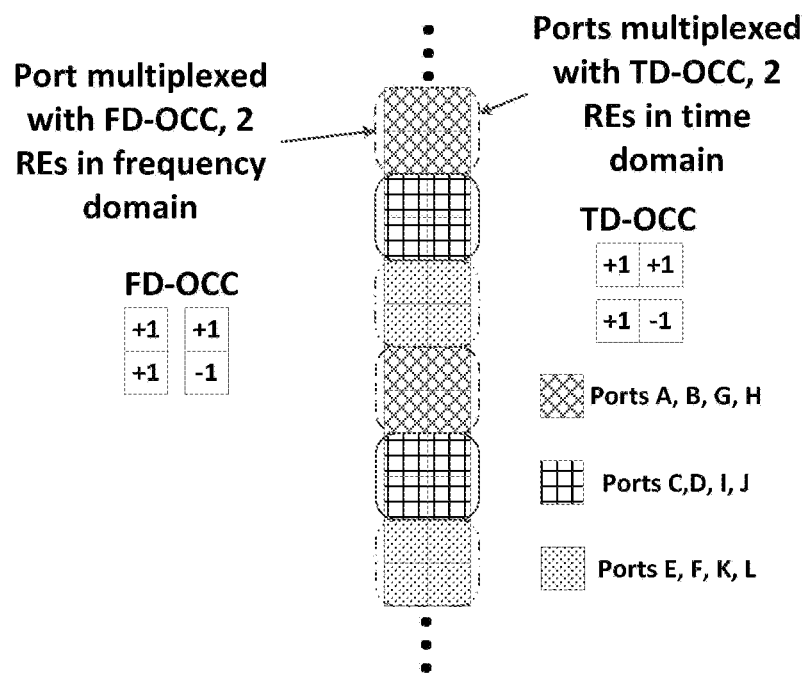

In some embodiments, for DMRS Configuration 2 associated with one symbol, up to 6 RS ports may be determined based on 2 FD-OCCs and 3 RE location values. That is, each RS port may be associated with a respective FD-OCC and a respective RE location value. In some other embodiments, for DMRS Configuration 2 associated with two symbols, up to 12 RS ports may be determined based on 2 FD-OCCs, 3 RE locations values and 2 TD-OCCs. That is, each RS port may be associated with a respective FD-OCC, a respective RE location value and a respective TD-OCC. In some embodiments, the port indices for DMRS Configuration 2 associated with one symbol may be overlapped with some of the port indices for DMRS Configuration 2 associated with two symbols. Specifically, in one embodiment, two RS ports configured with a same FD-OCC and a same RE location value may share a same port index. In this way, the number of indices of RS ports is reduced, and thus the overhead for indicating a RS configuration can be reduced. FIGS. 7A and 7B shows examples of such embodiments.

FIG. 7A shows examples for DMRS Configuration 2 associated with one symbol. FIG. 7A shows 6 RS ports, which are Ports A, B, C, D, E and F. Table 3 shows the detailed information associated with Ports A, B, C, D, E and F as shown in FIG. 7A. In one embodiment, for DMRS Configuration 2 associated with one symbol, TD-OCCs associated with Ports A, B, C, D, E and F may be unavailable as shown in Table 3. In another embodiment, for DMRS configuration 1 associated with one symbol, TD-OCC associated with each of Ports A, B, C, D, E and F may be {+1}. That is, the RS sequences for Ports A, B, C, D, E and F may be multiplied by applying {+1} on respective resource elements. In yet another embodiment, there may be no TD-OCC field for DMRS configuration 2 associated with one symbol. That is, the fourth column of Table 3 may not exist.

TABLE 3

| Port Index | FD-OCC | RE allocation value | TD-OCC |
|---|---|---|---|
| Port A | f0 (e.g. {1,1}) | a0 | N/A or {+1} |
| Port B | f1 (e.g. {1,-1}) | a0 | N/A or {+1} |
| Port C | f0 (e.g. {1,1}) | a1 | N/A or {+1} |

TABLE 3-continued

| Port Index | FD-OCC | RE allocation value | TD-OCC |
|---|---|---|---|
| Port D | f1 (e.g. {1,-1}) | a1 | N/A or {+1} |
| Port E | f0 (e.g. {1,1}) | a2 | N/A or {+1} |
| Port F | f1 (e.g. {1,-1}) | a2 | N/A or {+1} |

As shown in FIG. 7A and Table 3, Ports A and B are mapped into a same symbol and multiplexed based on CDM in frequency domain. For example, Ports A and B are configured with different FD-OCCs, in which Port A is associated with FD-OCC f0 and Port B is associated with FD-OCC f1. In one embodiment, FD-OCC f0 may be {1, 1} applied to the 2 adjacent REs in frequency domain. As shown in FIG. 7A and Table 3, the 2 adjacent REs are located in a same symbol but in different positions in frequency domain. In one embodiment, FD-OCC f1 may be {1, −1} applied to the 2 adjacent REs in frequency domain, which is different from the value of f0. Similarly, Ports C and D are mapped into a same symbol and multiplexed based on CDM in frequency domain. For example, Ports C and D are configured with different FD-OCCs, in which Port C is associated with FD-OCC f0 and Port D is associated with FD-OCC f1. Ports E and F are mapped into a same symbol and multiplexed based on CDM in frequency domain. For example, Ports E and F are configured with different FD-OCCs, in which Port E is associated with FD-OCC f0 and Port F is associated with FD-OCC f1.

In one embodiment, Ports (A, B), (C, D) and (E, F) may be multiplexed based on FDM. For example, Ports (A, B) are configured with different RS resources in frequency domain from Ports (C, D) and (E, F). In addition, Ports (C, D) are configured with different RS resources in frequency domain from Ports (A, B) and (E, F). In addition, Ports (E, F) are configured with different RS resources in frequency domain from Ports (A, B) and (C, D). That is, Ports (A, B), (C, D) and (E, F) are configured with different RE location values respectively, in which Ports (A, B) are associated with RE location value α0, Ports (C, D) are associated with RE location value α1 and Ports (E, F) are associated with RE location value α2.

FIG. 7B shows examples for DMRS Configuration 2 associated with two symbols. FIG. 7B shows 12 RS ports, which are Ports A, B, C, D, E, F, G, H, I, J, K and L. Table 4 shows the detailed information associated with Ports A, B, C, D, E, F, G, H, I, J, K and L as shown in FIG. 7B.

TABLE 4

| Port Index | FD-OCC | RE allocation value | TD-OCC |
|---|---|---|---|
| Port A | f0 (e.g. {1, 1}) | a0 | t0 (e.g. {1, 1}) |
| Port B | f1 (e.g. {1, −1}) | a0 | t0 (e.g. {1, 1}) |
| Port C | f0 (e.g. {1, 1}) | a1 | t0 (e.g. {1, 1}) |
| Port D | f1 (e.g. {1, −1}) | a1 | t0 (e.g. {1, 1}) |
| Port E | f0 (e.g. {1, 1}) | a2 | t0 (e.g. {1, 1}) |
| Port F | f1 (e.g. {1, −1}) | a2 | t0 (e.g. {1, 1}) |
| Port G | f0 (e.g. {1, 1}) | a0 | t1 (e.g. {1, −1}) |

TABLE 4-continued

| Port Index | FD-OCC | RE allocation value | TD-OCC |
|---|---|---|---|
| Port H | f1 (e.g. {1, −1}) | a0 | t1 (e.g. {1, −1}) |
| Port I | f0 (e.g. {1, 1}) | a1 | t1 (e.g. {1, −1}) |
| Port J | f1 (e.g. {1, −1}) | a1 | t1 (e.g. {1, −1}) |
| Port K | f0 (e.g. {1, 1}) | a2 | t1 (e.g. {1, −1}) |
| Port L | f1 (e.g. {1, −1}) | a2 | t1 (e.g. {1, −1}) |

As shown in FIG. 7B and Table 4, in one embodiment, Ports A and B are mapped into a same symbol and multiplexed based on CDM in frequency domain. For example, Ports A and B are configured with different FD-OCCs, in which Port A is associated with FD-OCC f0 and Port B is associated with FD-OCC f1. In one embodiment, FD-OCC f0 may be {1, 1} applied to the 2 adjacent REs in frequency domain. As shown in FIG. 7B and Table 4, the 2 adjacent REs are located in a same symbol but in different positions in frequency domain. In one embodiment, FD-OCC f1 may be {1, −1} applied to the 2 adjacent REs in frequency domain, which is different from the value of f0. Similarly, Ports C and D are mapped into a same symbol and multiplexed based on CDM in frequency domain. For example, Ports C and D are configured with different FD-OCCs, in which Port C is associated with FD-OCC f0 and Port D is associated with FD-OCC f1. Ports E and F are mapped into a same symbol and multiplexed based on CDM in frequency domain. For example, Ports E and F are configured with different FD-OCCs, in which Port E is associated with FD-OCC f0 and Port F is associated with FD-OCC f1. Ports G and H are mapped into a same symbol and multiplexed based on CDM in frequency domain. For example, Ports G and H are configured with different FD-OCCs, in which Port G is associated with FD-OCC f0 and Port H is associated with FD-OCC f1. Ports I and J are mapped into a same symbol and multiplexed based on CDM in frequency domain. For example, Ports I and J are configured with different FD-OCCs, in which Port I is associated with FD-OCC f0 and Port J is associated with FD-OCC f1. Ports K and L are mapped into a same symbol and multiplexed based on CDM in frequency domain. For example, Ports K and L are configured with different FD-OCCs, in which Port K is associated with FD-OCC f0 and Port L is associated with FD-OCC f1.

In one embodiment, Ports (A, B) and (G, H) may be multiplexed based on CDM in time domain, such as different TD-OCCs. For example, Ports (A, B) and (G, H) are configured with different TD-OCCs, in which Ports (A, B) are associated with TD-OCC t0 and Ports (G, H) are associated with TD-OCC t1. In one embodiment, TD-OCC t0 may be {1, 1} applied to the 2 adjacent REs. As shown in FIG. 5B, the 2 adjacent REs are located in the same position of frequency domain but in 2 different symbols. In one embodiment, TD-OCC t1 may be {1, −1} applied to the 2 adjacent REs, which is different from the value of t0. Similarly, Ports (C, D) and (I, J) may be multiplexed based on CDM in time domain, such as different TD-OCCs. For example, Ports (C, D) and (I, J) are configured with different TD-OCCs, in which Ports (C, D) are associated with TD-OCC t0 and Ports (I, J) are associated with TD-OCC t1. Ports (E, F) and (K, L) may be multiplexed based on CDM in time domain, such as different TD-OCCs. For example, Ports (E, F) and (K, L) are configured with different TD-OCCs, in which Ports (E, F) are associated with TD-OCC t0 and Ports (K, L) are associated with TD-OCC t1.

In one embodiment, Ports (A, B, G, H), (C, D, I, J) and (E, F, K, L) may be multiplexed based on FDM. For example, Ports (A, B, G, H) are configured with different RS resources in frequency domain from Ports (C, D, I, J) and (E, F, K, L). In addition, Ports (C, D, I, J) are configured with different RS resources in frequency domain from Ports (A, B, G, H) and (E, F, K, L). In addition, Ports (E, F, K, L) are configured with different RS resources in frequency domain from Ports (A, B, G, H) and (C, D, I, J). That is, Ports (A, B, G, H), (C, D, I, J) and (E, F, K, L) are configured with different RE location values respectively, in which Ports (A, B, G, H) are associated with RE location value α0, Ports (C, D, I, J) are associated with RE location value α1 and Ports (E, F, K, L) are associated with RE location value α2.

It can be seen from Table 3 and Table 4 that, RS ports associated with a same FD-OCC and a same RE location value may share a same port index. As such, the number of indices of RS ports can be reduced, thereby reducing the overhead for indicating a RS configuration.

Referring back to FIG. 3, the method 300 exceeds to act 320, where a plurality of RS configurations are determined. In some embodiments, the plurality of RS configurations may be determined at least based on the plurality of RS ports determined in act 310. For example, each of the plurality of RS configurations may include information on at least one of the following: a RS configuration pattern, a set of RS ports to be used for RS transmission, respective RS sequences, antenna ports and/or scrambling identity and/or the number of transmission layers, transmission power and so on.

In some embodiments, different RS sequences may be generated for different RS ports. In one embodiment, the RS sequences for RS ports multiplexed based on FDM or configured with different comb offset values or configured with different RE locations in frequency domain may be different. In another embodiment, the RS sequences for RS ports multiplexed based on CDM in time domain may be different. In another embodiment, the RS sequences for RS ports multiplexed based on CDM in frequency domain may be the same.

In some embodiments, the RS sequences may be generated for all of REs in frequency domain. For each RS port, respective symbols transmitted on the REs allocated for the RS port may be derived for RS transmission. In some embodiments, a RS sequence to be transmitted with a RS port may be determined at least in part based on the CS value associated with the RS port. For example, a cyclic shift and/or phase rotation parameter for the RS sequence may be determined based on the CS value associated with the RS port for transmitting the RS sequence. In one embodiment, the RS sequence $r^\alpha(n)$ may be determined by applying a cyclic shift parameter α to a base sequence r(n), such as $r^\alpha(n) = e^{j\alpha m} r(n)$. For example, m represents an index for cyclic shift applied to different REs, and n represents an index for the transmitted symbol in the RS sequence. For example, the index for cyclic shift applied to different REs may be the same as the index for the transmitted symbol in the RS sequence, that is, m=n.

Taking DMRS Configuration 1 as an example, as shown in FIG. 5A (which shows examples of DMRS Configuration 1 associated with one symbol), Ports A and C are associated with CS value c0, while Ports B and D are associated with CS value c1. As shown in FIG. 5B (which shows examples of DMRS Configuration 1 associated with two symbols), Ports A, C, E and G are associated with CS value c0, while Ports B, D, F and H are associated with CS value c1. In some embodiments, different CS values c0 and c1 may correspond to different cyclic shift parameters for RS sequences, respectively. For example, CS value c0 may correspond to a cyclic shift parameter α1, while CS value c1 may correspond to another cyclic shift parameter α2.

Figure 5C:
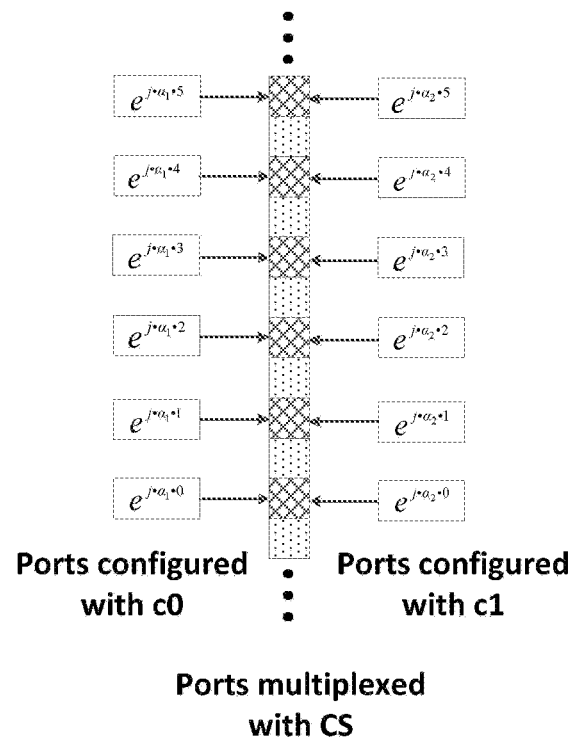

FIG. 5C shows an example for the RS ports multiplexed based on cyclic shift in frequency domain. For example, in one embodiment, 6 REs in one physical resource block (PRB) may be configured for one RS port. In this case, if the cyclic shift parameter is configured as c0, the cyclic shifts applied to the 6 REs in the PRB will be $(1, e^{j\alpha 1}, e^{j2\alpha 1}, e^{j3\alpha 1}, e^{j4\alpha 1}, e^{j5\alpha 1})$. If the cyclic shift parameter is configured as c1, the cyclic shifts applied to the 6 REs in the PRB will be $(1, e^{j\alpha 1}, e^{j2\alpha 2}, e^{j3\alpha 2}, e^{j4\alpha 1}, e^{j5\alpha 2})$.

In some embodiments, the two cyclic shift parameters α1 and α2 may have a phase difference π, that is α1=α2+π or α2=α1+π. If m is even, $e^{j\alpha 1 m} = -e^{j\alpha 2 m}$. If m is odd, $e^{j\alpha 1 m} = -e^{j\alpha 2 m}$. In one embodiment, m may represent an index of the transmitted symbol in the RS sequence. Alternatively, m may represent an index of the RE in frequency domain. In one embodiment, for an even number of REs in frequency domain, m may be fixed to be 0. In addition, for an odd number of REs in frequency domain, m may be fixed to be 1. In another embodiment, m=mod (n, 2). For example, in one embodiment, 6 REs in one physical resource block (PRB) may be configured for one RS port. In this case, if the cyclic shift parameter is configured as c0, the cyclic shifts applied to the 6 REs in the PRB will be $(1, e^{j\alpha 1}, e^{j2\alpha 1}, e^{j3\alpha 1}, e^{j4\alpha 1}, e^{j5\alpha 1})$. If the cyclic shift parameter is configured as c1, the cyclic shifts applied to the 6 REs in the PRB will be $(1, -e^{j\alpha 1}, e^{j2\alpha 1}, -e^{j3\alpha 1}, e^{j4\alpha 1}, -e^{j5\alpha 1})$. Particularly, in one embodiment, the two cyclic shift parameters α1 and α2 may be 0 and π, respectively. If the cyclic shift value is configured as c0, the cyclic shifts applied to the 6 REs in the PRB will be (1, 1, 1, 1, 1, 1). If the cyclic shift value is configured as c1, the cyclic shifts applied to the 6 REs in the PRB will be (1, −1, 1, −1, 1, −1).

In some embodiments, the cyclic shift parameters (for example, α1 and α2) may be configured via higher layer signaling, such as signaling on Radio Resource Control (RRC) Layer, Medium Access Control (MAC) layer and so on.

In some embodiments, the cyclic shift parameters may be different for different values of some configuration parameters. For example, the configuration parameters may be at least one of symbol index, slot index, sub-frame index, frame index, cell ID, TRP ID, panel ID, beam ID, frequency location, comb offset values and etc. In one embodiment, for the cyclic shift values c0 and c1, there may be one or more sets of cyclic shift parameters α1 and α2 associated with different values of at least one of the configuration parameters. That is, for different values of at least one of the configuration parameters, the values of α1 and α2 may be different. For example, for the cyclic shift values c0 and c1, the values of the cyclic shift parameters α1 and α2 may equal to α1_1 and α2_1 respectively, if at least one of the configuration parameters is configured to be a first value. If the at least one of the configuration parameters is configured to be a second value different from the first value, the values of the cyclic shift parameters α1 and α2 may equal to α1_2 and α2_2 respectively. For example, if the comb offset value is configured as b0, the values of the cyclic shift parameters α1 and α2 may equal to α1_1 and α2_1 respectively. If the comb offset value is configured as b1, the values of the cyclic shift parameters α1 and α2 may equal to α1_2 and α2_2 respectively. For another example, in case that the DMRS is configured with 2 symbols, for the first symbol for DMRS, the values of the cyclic shift parameters α1 and α2 may equal to α1_1 and α2_1 respectively; while for the second symbol for DMRS, the values of the cyclic shift parameters α1 and α2 may equal to α1_2 and α2_2 respectively. In the above examples, α1_1 may different from α1_2, and α2_1 is different from α2_2. For example, for different cell IDs or TRP IDs, the cyclic shift parameters may be different. However, for a specific cell ID or TRP ID, the cyclic shift parameters may be identical for all of the UEs served by the cell and/or TRP. In some embodiments, for each set of cyclic shift parameters α1 and α2, the phase difference is fixed. For example, α1_i−α2_i=Δα, where α1_i may represent the value of α1, α2_i may represent the value of α2 and Δα may be a fixed value. For another example, the absolute value of phase difference for the two cyclic shift parameters may be identical, that is |α1_i−α2_i|=Δα.

In some embodiments, the two cyclic shift parameters (a1, α2) corresponding to the two cyclic shift values c0 and c1 may be selected from at least one of (0, 3), (1, 4) and (2, 5).

In some embodiments, if the RS ports are multiplexed based on CDM in frequency domain and/or CDM in time domain, for example configured with different cyclic shift values, different FD-OCCs or different TD-OCCs, the RS sequences for the RS ports may be the same. In some embodiments, for different RS ports, the RS symbols transmitted in the same RE in time and/or frequency domain may be the same.

In one embodiment, if DMRS Configuration 1 associated with one symbol is configured, for example as shown in FIG. 5A, the RS sequence for Port A may be the same as that for Port C, and the RS sequence for Port B may be the same as that for Port D. For example, the RS sequence for Ports A and/or C and the RS sequence for Ports B and/or D may be the same or different. For example, the symbols transmitted with Ports A and/or C and the symbols transmitted with Ports B and/or D may be derived from a same sequence, and the values thereof may be different.

In one embodiment, if DMRS Configuration 1 associated with two symbols is configured, for example as shown in FIG. 5B, the RS sequence for Port A may be the same as that for Port C, the RS sequence for Port B may be the same as that for Port D, the RS sequence for Port E may be the same as that for Port G and the RS sequence for Port F may be the same as that for Port H. For example, the RS sequence for Ports A and/or C, the RS sequence for Ports E and/or G, the RS sequence for Ports B and/or D and the RS sequence for Ports F and/or H may be the same or different. For example, the symbols transmitted with Port A, C, E and/or G and the symbols transmitted with Port B, D, F and/or H may be derived from a same sequence, and the values thereof may be different. For example, for the cyclic shift value c0 in the first symbol, the value of the corresponding cyclic shift parameter α1 may equal to α1_1. For the cyclic shift value c0 in the second symbol, the value of the corresponding cyclic shift parameter α1 may equal to α1_2. For the cyclic shift value c1 in the first symbol, the value of the corresponding cyclic shift parameter α2 may equal to α2_1. For the cyclic shift value c1 in the second symbol, the value of the corresponding cyclic shift parameter α2 may equal to α2_2. In one embodiment, if the RS sequence for the first RS symbol is the same as that for the second RS symbols the cyclic shift parameters for the two RS symbols may be different. That is, α1_1≠α1_2 and α2_1≠α2_2. In one embodiment, if the cyclic shift parameters for the two RS symbols are the same, that is α1_1=α1_2 and α2_1=α2_2, the RS sequences transmitted in the two RS symbols may be different.

In one embodiment, if DMRS Configuration 2 associated with one symbol is configured, for example as shown in FIG. 7A, the RS sequence for Port A may be the same as that for Port B, the RS sequence for Port C may be the same as that for Port D and the RS sequence for Port E may be the same as that for Port F. For example, the RS sequence for Ports A and/or B, the RS sequence for Ports C and/or D may be the same or different. The RS sequence for Ports A and/or B and the RS sequence for Ports E and/or F may be the same or different. The RS sequence for Ports E and/or F and the RS sequence for Ports C and/or D may be the same or different. For example, the symbols transmitted with Ports A and/or B, the symbols transmitted with Ports C and/or D and the symbols transmitted with Ports F and/or H may be derived from a same sequence, and the values thereof may be different.

In one embodiment, if DMRS Configuration 2 associated with two symbols is configured, for example as shown in FIG. 7B, the RS sequence for Port A may be the same as that for Port B. The RS sequence for Port C may be the same as that for Port D. The RS sequence for Port E may be the same as that for Port F. The RS sequence for Port G may be the same as that for Port H. The RS sequence for Port I may be the same as that for Port J. In addition, the RS sequence for Port K may be the same as that for Port L. For example, the RS sequences for Ports A, B, G and/or H and the RS sequences for Ports C, D, I and/or J may be the same or different. The RS sequences for Ports A, B, G and/or H and the RS sequences for Ports E, F, K and/or L may be the same or different. The RS sequences for Ports C, D, I and/or J and the RS sequences for Ports E, F, K and/or L may be the same or different. For example, the symbols transmitted with Ports A, B, G and/or H and the symbols transmitted with Ports C, D, I and/or J and the symbols transmitted with Ports E, F, K and/or L may be derived from a same sequence, and the values thereof may be different.

In one embodiment, in case that DMRS Configuration 1 associated with two symbols is configured, for example as shown in FIG. 5B, if the RS sequences for Ports A, C, E and G are the same and the RS sequences for Ports B, D, F and H are the same, then the RS sequences for the same RS port in the two symbols may be different or the RS symbols transmitted in the same frequency RE location in the two symbols may be different. If the RS sequence for Ports A and/or C and the RS sequence for Ports E and/or G are different, or the RS sequence for Ports B and/or D and the RS sequence for Ports F and/or H are different, then the RS sequences for the same RS port in the two symbols should be the same or the RS symbols transmitted in the same frequency RE location in the two symbols should be the same.

In one embodiment, in case that DMRS Configuration 2 associated with two symbols is configured, for example as shown in FIG. 7B, if the RS sequences for Ports A, B, G, H are the same, the RS sequences for Ports C, D, I and J are the same and the RS sequences for Ports E, F, K and L are the same, then the RS sequence for the same RS port in the two symbols may be different or the RS symbols transmitted in the same frequency RE location in the two symbols may be different. If the RS sequence for Ports A and/or B and the RS sequence for Port G and/or H are different, the RS sequence for Ports C and/or D and the RS sequence for Ports I and/or J are different, or the RS sequence for Ports E and/or G and the RS sequence for Ports K and/or L are different, then the RS sequence for the same port in the two symbols should be the same or the RS symbols transmitted in the same frequency RE location in the two symbols should be the same.

Referring back to FIG. 3, the method 300 exceeds to act 330, where at least one RS configuration from the plurality of RS configurations is allocated for the terminal device 120 served by the network device 110. In some embodiments, the at least one RS configuration may be selected from the plurality of RS configurations by the network device 110 and indicated to the terminal device 120. The at least one RS configuration may indicate at least one RS port to be used for RS transmission.

In some embodiments, in order to indicate the at least one RS configuration to the terminal device 120, the RS configuration pattern may be indicated in advance (also referred to as "the first indication" in the following) to the terminal device 120 via higher layer signaling, such as signaling on Radio Resource Control (RRC) Layer, Medium Access Control (MAC) layer and so on. The first indication of RS configuration pattern may be conducted per bandwidth part, per sub-band, and/or per component carrier. For example, the DMRS configuration pattern, the number of DMRS symbols, whether additional DMRS besides the front-loaded DMRS is configured and/or the maximum number of DMRS ports may be indicated via higher layer signaling. The at least one RS port to be used for RS transmission may be further indicated (also referred to as "the second indication" in the following) to the terminal device 120 via higher layer signaling and/or dynamic signaling. For example, in some embodiments, the network device 110 may include the information on the at least one RS port in Downlink Control Information (DCI), and indicated to the terminal device 120 via Physical Downlink Control Channel (PDCCH). The information included in DCI may include at least one port index of the at least one RS port, as well as antenna port(s), scrambling identity, the number of RS transmission layers and/or some other information.

In some embodiments, the plurality of RS ports determined in act 310 may be divided into a plurality of sets based on different assumptions related to RS transmission. The plurality of sets of RS ports may be separated from each other or overlapped with each other in part. In one embodiment, for a determined number of RS transmission layers, at least one of the plurality of sets may be included in the second indication and indicated to the terminal device.

As described above, in some embodiments, different set of RS ports may be associated with different assumptions related to RS transmission respectively. In some embodiments, the different assumptions may be directed to at least one of the following: the number of RS symbols, single or multiple user scheduling, single-TRP or multiple-TRP scheduling, whether DMRS and data are multiplexed in the same symbol, power offset associated with RS transmission, QCL, information on RS transmission layers and PTRS configuration.

In some embodiments, there may be a plurality of indices to indicate the RS information. The RS information may include at least one of the following: the number of RS ports, the indices of the RS ports, the number of symbols for RS transmission, scrambling identity for generation of the RS sequence, sequence index of RS, cyclic shift values of the RS ports, comb offset values of the RS ports, RE locations of the RS ports, OCC values in time domain, OCC values in frequency domain and etc. In one embodiment, DMRS configuration pattern may be configured as DMRS Configuration 1 or DMRS configuration 2 via higher layer signaling.

In addition, there may be a plurality of indices for indicating the DMRS information in DCI. In one embodiment, for the different indices, different assumptions may be directed to at least one of the following: the number of RS symbols, single or multiple user scheduling, single-TRP or multiple-TRP scheduling, whether DMRS and data are multiplexed in the same symbol, power offset associated with RS transmission, QCL, information on RS transmission layers and PTRS configuration. In one embodiment, for the indices indicating the same number of RS ports or layers, different assumptions may be assumed. In another embodiment, for the indices indicating the same number of RS ports or layers and same RS port indices, different assumptions may be assumed.

In some embodiments, there may be a plurality of indices for indicating the DMRS information. For example, the plurality of indices may be transmitted in DCI and/or via higher layer signaling. In some embodiments, there may be several indices indicating the same number of DMRS ports and/or indices of DMRS ports. The indices may be divided into plurality of subsets, for different subsets, different assumptions may be assumed.

In one embodiment, there may be a plurality of indices indicating the same number of transmission layers, the same number of DMRS ports or same indices of DMRS ports. The plurality of indices may be divided into two subsets that are first and second subsets. In this case, the number of DMRS symbols associated with the first subset may be assumed as 1 and the number of DMRS symbols associated with the second subset may be assumed as 2. For example the number of layers or the number of DMRS ports may be no more than 4 for DMRS Configuration 1 and/or no more than 6 for DMRS Configuration 2.

In one embodiment, there may be a plurality of indices indicating the same number of transmission layers, the same number of DMRS ports or same indices of DMRS ports. The plurality of indices may be divided into two subsets that are first and second subsets. In this case, multiplexing of DMRS and data in the same symbol (such as based on FDM) may be supported for the first subset and the multiplexing of DMRS and data in the same symbol (such as based on FDM) may not be supported for the second subset.

In one embodiment, there may be a plurality of indices indicating the same number of transmission layers, the same number of DMRS ports or same indices of DMRS ports. The plurality of indices may be divided into two subsets that are first and second subsets. In this case, multi-user scheduling may be assumed for the first subset, and multi-user scheduling may not be assumed for the second subset. For example, only single user scheduling may be assumed for the second subset.

In one embodiment, there may be a plurality of indices indicating the same number of transmission layers, the same number of DMRS ports or same indices of DMRS ports. The plurality of indices may be divided into two subsets that are first and second subsets. In this case, multi-TRP scheduling may be assumed for the first subset, and multi-TRP scheduling not be assumed for the second subset. For example, only single TRP scheduling is assumed for the second subset.

In one embodiment, there may be a plurality of indices indicating the same number of transmission layers, the same number of DMRS ports or same indices of DMRS ports. The plurality of indices may be divided into two subsets that are first and second subsets. In this case, the number of PTRS ports may be assumed to be X for the first subset, and the number of PTRS ports may be assumed to be Y for the second subset, where $X \neq Y$.

In one embodiment, there may be a plurality of indices indicating the same number of transmission layers, the same number of DMRS ports or same indices of DMRS ports. The plurality of indices may be divided into two subsets that are first and second subsets. In this case, power offset between DMRS and data or power offset between PTRS and DMRS or power offset between PTRS and data may be assumed to be $\Delta p_1$ for the first subset, and power offset between DMRS and data or power offset between PTRS and DMRS or power offset between PTRS and data may be assumed to be $\Delta p_2$ for the second subset, where $\Delta p_1 \neq \Delta p_2$.

In one embodiment, there may be a plurality of indices indicating the same number of transmission layers, the same number of DMRS ports or same indices of DMRS ports. The plurality of indices may be divided into K subsets, where K is integer and $K \geq 1$. In this case, the sequence index for DMRS may be assumed to be i for the $i^{th}$ subset, where $1 \leq i \leq K$.

In one embodiment, there may be a plurality of indices indicating the same number of transmission layers, the same number of DMRS ports or same indices of DMRS ports. The plurality of indices may be divided into K subsets, where K is integer and $K \geq 1$. In this case, the RE index in one PRB for PTRS may be different for different subsets. For example the RE index may be $L_i$ for the $i^{th}$ subset, where $1 \leq i \leq K$. In one embodiment, the PTRS may be mapped to one or more REs of a RE set in one PRB, and the RE set may be used for DMRS transmission. In one embodiment, for the ports mapped to a group of REs, different ports for PTRS transmission may be mapped to different REs of the group of REs. For example, in one PRB, there may be 12 REs in the same symbol.

In one embodiment, as shown in FIG. 5A or FIG. 5B, Ports A and C may be mapped to the $1^{st}$, $3^{rd}$, $5^{th}$, $7^{th}$, $9^{th}$ and $11^{th}$ REs, and the REs may be divided into two subsets that are first and second subsets. PTRS associated with Port A may be mapped to one or more REs in the first subset, and PTRS associated with Port C may be mapped to one or more REs in the second subset. Ports B and D may be mapped to the $2^{nd}$, $4^{th}$, $6^{th}$, $8^{th}$, $10^{th}$, and 12th REs, and the REs may be divided into two subsets that are third and fourth subsets. PTRS associated with Port B may be mapped to one or more REs of the third subset, and PTRS associated with Port D may be mapped to one or more REs of the fourth subset. For example, the PTRS associated with Port A may be mapped to one or more of the $1^{st}$, $3^{rd}$ and $5^{th}$ REs, and the PTRS associated with Port C may be mapped to one or more of the $7^{th}$, $9^{th}$ and $11^{th}$ REs. For another example, the PTRS associated with Port B may be mapped to one or more of the $2^{nd}$, $4^{th}$ and $6^{th}$ REs, and the PTRS associated with Port D may be mapped to one or more of the $8^{th}$, $10^{th}$, and $12^{th}$ REs.

In one embodiment, as shown in FIG. 5B, Ports A, C, E, G may be mapped to the $1^{st}$, $3^{rd}$, $5^{th}$, $7^{th}$, $9^{th}$ and $11^{th}$ REs. PTRS associated with Port A and/or Port C may be mapped to different REs from PTRS associated with Port E and/or Port G. Ports B, D, F and H may be mapped to the $2^{nd}$, $4^{th}$, $6^{th}$, $8^{th}$, $10^{th}$, and 12th REs. PTRS associated with Port B and/or Port D may be mapped to different REs from PTRS associated with Port F and/or Port H. In another embodiment, the PTRSs associated with Ports A, C, E and G may be mapped to different REs from each other. In another embodiment, the PTRSs associated with Port B, D, F and H may be mapped to different REs from each other. For example, the PTRS associated with Port A may be mapped to one or more of the $1^{st}$, $3^{rd}$ and $5^{th}$ REs. The PTRS associated with port C may be mapped to one or more of the $1^{st}$, $3^{rd}$ and $5^{th}$ REs. The PTRS associated with Port E may be mapped to one or more of the $7^{th}$, $9^{th}$ and $11^{th}$ REs. The PTRS associated with Port G may be mapped to one or more of the $7^{th}$, $9^{th}$ and $11^{th}$ REs. For another example, the PTRS associated with port B may be 4th mapped to one or more of the $2^{nd}$, $4^{th}$ and $6^{th}$ REs. The PTRS associated with port D may be mapped to one or more of the 2nd, $4^{th}$ and $6^{th}$ REs. The PTRS associated with port F may be mapped to the $8^{th}$, $10^{th}$, and $12^{th}$ REs. The PTRS associated with port H may be mapped to the 8th, 10th, and 12th REs.

In one embodiment, as shown in FIG. 7A or FIG. 7B, Ports A and B may be mapped to the $1^{st}$, $2^{nd}$, $7^{th}$, $8^{th}$ REs, which may be divided into two subsets, that are first and second subsets. PTRS associated with Port A may be mapped to one or more REs of the first subset, and PTRS associated with Port B may be mapped to one or more REs of the second subset. Ports C and D may be mapped to the $3^{rd}$, $4^{th}$, $9^{th}$, $10^{th}$ REs, and the REs may be divided into two subsets, that are third and fourth subsets. PTRS associated with Port C may be mapped to one or more REs of the third subset, and PTRS associated with Port D may be mapped to one or more REs of the fourth subset. Ports E and F may be mapped to the $5^{th}$, $6^{th}$, $11^{th}$, $12^{th}$ REs, and the REs may be divided into two subsets, that are fifth and sixth subsets. PTRS associated with Port E may be mapped to one or more REs of the fifth subset, and PTRS associated with Port F may be mapped to one or more REs of the sixth subset.

In one embodiment, as shown in FIG. 7B, Ports A, B, G and H may be mapped to the $1^{st}$, $2^{nd}$, $7^{th}$, $8^{th}$ REs, which may be divided into two subsets, that are first and second subsets. PTRS associated with Ports A and/or B may be mapped to one or more REs of the first subset, and PTRS associated with Ports G and/or H may be mapped to one or more REs of the second subset. Ports C, D, I and J may be mapped to the $3^{rd}$, $4^{th}$, $9^{th}$, $10^{th}$ REs, and PTRS associated with Ports C and/or Port D may be mapped to different REs from PTRS associated with Ports I and/or J. Port E, F, K and L may be mapped to the $5^{th}$, $6^{th}$, $11^{th}$, $12^{th}$ REs, and PTRS associated with Ports E and/or F may be mapped to different REs from PTRS associated with Ports K and/or L. In another embodiment, the PTRSs associated with Ports A, B, G and H may be mapped to different REs from each other. In another embodiment, the PTRSs associated with Ports C, D, I and J may be mapped to different REs from each other. In another embodiment, the PTRSs associated with Ports E, F, K and L may be mapped to different REs from each other. In some embodiments, there may be 6 sets of two adjacent REs in frequency domain, and one of the 6 sets of two adjacent Res may be REs multiplexed based on FD-OCC. For example, the 6 sets may be represented as {s0, s1, s2, s3, s4, s5}, and two of the 6 sets (for example s0 and s3) may be used for Ports A, B, G and H, another two of the 6 sets (for example s1 and s4) may be used for Ports C, D, G and H, and the rest two of the 6 sets (for example s2 and s5) may be used for Ports E, F, K and L. In one embodiment, PTRS associated with Port A may be mapped to one RE of s0, while PTRS associated with Port B may be mapped to another RE of s0. PTRS associated with Port G may be mapped to one RE of s3, while PTRS associated with Port H may be mapped to another RE of s3. PTRS associated with Port C may be mapped to one RE of s1, while PTRS associated with Port D may be mapped to another RE of s1. PTRS associated with Port I may be mapped to one RE of s4, while PTRS associated with Port J may be mapped to another RE of s4. PTRS associated with Port E may be mapped to one RE of s2, while PTRS associated with Port F may be mapped to another RE of s2. PTRS associated with Port K may be mapped to one RE of s5, while PTRS associated with Port L may be mapped to another RE of s5.

In some embodiments, there may be a plurality of indications for indicating the DMRS information, one of which may indicate at least one of the number of DMRS ports or layers and/or the indices of DMRS ports. In some embodiments, for the indicated DMRS information, the DMRS ports may be multiplexed in different manners. For example, the DMRS ports may be multiplexed based on at least one of the following: FDM, CDM in frequency domain, CDM in time domain, IFDMA, different cyclic shift values, different TD-OCC values, different FD-OCC values and etc. In some embodiments, different DMRS ports multiplexing manners (also referred to as "multiplexing type") may be associated with different assumptions.

In one embodiment, for some of the plurality of indications, if the DMRS ports are multiplexed based on CDM in frequency domain and/or CDM in time domain, then multi-user scheduling may be assumed. In another embodiment, for some of the plurality of indications, if the DMRS ports are multiplexed based on FDM or IFDMA and/or CDM in time domain, then single-user scheduling may be assumed. In one embodiment, for some of the plurality of indications, if the DMRS ports are multiplexed based on CDM in frequency domain and/or CDM in time domain, then multiplexing of DMRS and data in the same symbol (such as based on FDM) may be supported. In another embodiment, for some of the plurality of indications, if the DMRS ports are multiplexed based on FDM and/or IFDMA, multiplexing of DMRS and data in same symbol (such as based on FDM) may not be supported.

In one embodiment, for some of the plurality of indications, if the DMRS ports are multiplexed based on CDM in frequency domain and/or CDM in time domain, the number of PTRS ports may be assumed to be X. In another embodiment, for some of the plurality of indications, if the DMRS ports are multiplexed based on FDM or IFDMA and/or CDM in time domain, the number of PTRS ports may be assumed to be Y, where X≠Y. In one embodiment, for some of the plurality of indications, if the DMRS ports are multiplexed based on CDM in frequency domain and/or CDM in time domain, power offset between DMRS and data, power offset between PTRS and DMRS or power offset between PTRS and data may be assumed to be $\Delta p_1$. In another embodiment, for some of the plurality of indications, if the DMRS ports are multiplexed based on FDM or IFDMA and/or CDM in time domain, power offset between DMRS and data, power offset between PTRS and DMRS or power offset between PTRS and data may be assumed to be $\Delta p_2$, where $\Delta p_1 \neq \Delta p_2$. In one embodiment, for some of the plurality of indications, if the DMRS ports are multiplexed based on CDM in frequency domain and/or CDM in time domain, the sequence index for DMRS may be assumed to be i. In another embodiment, for some of the plurality of indications, if the DMRS ports are multiplexed based on FDM or IFDMA and/or CDM in time domain, the number of PTRS ports may be assumed to be j, where i≠j.

For example, in case of DMRS configuration 1, if DMRS is associated with one symbol, up to 4 Ports (for example, Ports A, B, C and D) may be supported. If DMRS is associated with two symbols, up to 8 Ports (for example, Ports A, B, C, D, E, F, G and H) may be supported. In some embodiments, the up to 8 ports may be divided into a plurality of sets based on different assumptions related to RS transmission. For a determined number of RS transmission layers, at least one set of RS ports may be selected from plurality of sets and included in the second indication.

In some embodiments, for one transmission layer, the plurality of sets may include but not limited to: Set 00 {Port A; Port B; Port C; Port D}; Set 01 {Port A; Port B; Port C; Port D}; Set 02 {Port A; Port B}; and Set 03 {Port C; Port D}. In one embodiment, at least one of the above plurality of sets may be included in the second indication and indicated to the terminal device 120. The above plurality of sets may be associated with different assumptions related to RS transmission respectively.

In one embodiment, for example, the assumptions associated with Set 00 {Port A; Port B; Port C; Port D} may include that resources for data transmission and resources for transmitting DMRS cannot be multiplexed based on FDM. Then, no matter how many terminal devices are scheduled, the transmission power for DMRS (also referred to as "p_DMRS") is 3 dB higher than the transmission power for data (also referred to as "p_data"), that is p_DMRS=p_data+3 dB. Alternatively or in addition, in another embodiment, the assumptions associated with Set 00 {Port A; Port B; Port C; Port D} may include that REs for transmitting PTRS are different from those associated with respective DMRS ports.

In one embodiment, for example, the assumptions associated with Set 02 {Port A; Port B} may include that resources for data transmission and resources for transmitting DMRS are multiplexed based on FDM. Then, the transmission power for DMRS should be the same as the transmission power for data, that is p_DMRS=p_data. Alternatively or in addition, in another embodiment, the assumptions associated with Set 02 {Port A; Port B} may include that REs for transmitting PTRS are same as those associated with Port A and/or Port B. Then, the transmission power for PTRS (also referred to as "p_PTRS") should be the same as the transmission power for DMRS, that is p_PTRS=p_DMRS. Alternatively or in addition, in yet another embodiment, the assumptions associated with Set 02 {Port A; Port B} may include that REs for transmitting PTRS are same as those for transmitting DMRS, but a different comb offset value is applied to the REs for transmitting PTRS. Then, the transmission power for PTRS is 3 dB higher than the transmission power for DMRS, that is p_PTRS=p_DMRS+3 dB.

In one embodiment, for example, the assumptions associated with Set 03 {Port C; Port D} may include that resources for data transmission and resources for transmitting DMRS are multiplexed based on FDM. Then, the transmission power for DMRS should be the same as the transmission power for data, that is p_DMRS=p_data. Alternatively or in addition, in another embodiment, the assumptions associated with Set 03 {Port C; Port D} may include that REs for transmitting PTRS are same as those associated with Port C and/or Port D. Then, the transmission power for PTRS (also referred to as "p_PTRS") should be the same as the transmission power for DMRS, that is p_PTRS=p_DMRS. Alternatively or in addition, in yet another embodiment, the assumptions associated with Set 03 {Port C; Port D} may include that REs for transmitting PTRS are same as those for transmitting DMRS, but a different comb offset value is applied to the REs for transmitting PTRS. Then, the transmission power for PTRS is 3 dB higher than the transmission power for DMRS, that is p_PTRS=p_DMRS+3 dB.

In some embodiments, for two transmission layers, the plurality of sets may include but not limited to: Set 04 {Ports (A, B); Ports (C, D)}; Set 05 {Ports (A, C); Ports (B, D)}; Set 06 {Ports (A, D); Ports (B, C)}; and Set 07 {Ports (A, B)}. In one embodiment, at least one of the above plurality of sets may be included in the second indication and indicated to the terminal device 120. The above plurality of sets may be associated with different assumptions related to RS transmission respectively.

In one embodiment, for example, the assumptions associated with Set 04 {Ports (A, B); Ports (C, D)} may include that only multi-user scheduling is supported, and p_DMRS=p_data+3 dB. Alternatively or in addition, in another embodiment, the assumptions associated with Set 04 {Ports (A, B); Ports (C, D)} may include that resources for data transmission and resources for transmitting DMRS cannot be multiplexed based on FDM, and p_DMRS=p_data+3 dB. Alternatively or in addition, in another embodiment, the assumptions associated with Set 04 {Ports (A, B); Ports (C, D)} may include that the two transmission layers cannot be from different Transmission and Reception Points (TRPs). Alternatively or in addition, in yet another embodiment, the assumptions associated with Set 04 {Ports (A, B); Ports (C, D)} may include that PTRS are transmitted with Port A or Port C, and p_PTRS=p_DMRS+3 dB.

In one embodiment, for example, the assumptions associated with Set 05 {Ports (A, C); Ports (B, D)} may include that resources for data transmission and resources for transmitting DMRS cannot be multiplexed based on FDM, and p_DMRS=p_data+3 dB. Alternatively or in addition, in another embodiment, the assumptions associated with Set 05 {Ports (A, C); Ports (B, D)} may include that the two transmission layers can be from different TRPs. Alternatively or in addition, in yet another embodiment, the assumptions associated with Set 05 {Ports (A, C); Ports (B, D)} may include: Ports A and C are QCLed; Port A is used for transmitting PTRS; and p_PTRS=p_DMRS. Alternatively or in addition, in yet another embodiment, the assumptions associated with Set 05 {Ports (A, C); Ports (B, D)} may include: Ports A and C are not QCLed; Ports A and C are used for transmitting PTRS; and p_PTRS=p_DMRS.

In one embodiment, for example, the assumptions associated with Set 06 {Ports (A, D); Ports (B, C)} may include that resources for data transmission and resources for transmitting DMRS cannot be multiplexed based on FDM, and p_DMRS=p_data+3 dB. Alternatively or in addition, in another embodiment, the assumptions associated with Set 06 {Ports (A, D); Ports (B, C)} may include that the two transmission layers can be from different TRPs. Alternatively or in addition, in yet another embodiment, the assumptions associated with Set 06 {Ports (A, D); Ports (B, C)} may include: Ports A and D are QCLed; Port A is used for transmitting PTRS; and p_PTRS=p_DMRS. Alternatively or in addition, in yet another embodiment, the assumptions associated with Set 06 {Ports (A, D); Ports (B, C)} may include: Ports A and D are not QCLed; Ports A and D are used for transmitting PTRS; and p_PTRS=p_DMRS.

In one embodiment, for example, the assumptions associated with Set 07 {Ports (A, B)} may include that resources for data transmission and resources for transmitting DMRS are multiplexed based on FDM, and p_DMRS=p_data. Alternatively or in addition, in another embodiment, the assumptions associated with Set 07 {Ports (A, B)} may include that Port A is used for transmitting PTRS, and p_PTRS=p_DMRS+3 dB.

In some embodiments, for three transmission layers, the plurality of sets may include but not limited to: Set 08 {Ports (A, B, C)} and Set 09 {Ports (B, C, D)}. In one embodiment, at least one of the above plurality of sets may be included in the second indication and indicated to the terminal device

120. The above plurality of sets may be associated with different assumptions related to RS transmission respectively.

In one embodiment, for example, the assumptions associated with Set 08 {Ports (A, B, C)} may include: if only one PTRS port is supported, Port A is used for PTRS transmission; and if two PTRS ports are supported, Ports A and C are used for PTRS transmission.

In one embodiment, for example, the assumptions associated with Set 09 {Ports (B, C, D)} may include that Port A is reserved for single layer transmission. Alternatively or in addition, in another embodiment, the assumptions associated with Set 09 {Ports (B, C, D)} may include that if only one PTRS port is supported, Port C is used for PTRS transmission, while Port A is reserved for single layer transmission. Alternatively or in addition, in another embodiment, the assumptions associated with Set 09 {Ports (B, C, D)} may include: if only one PTRS port is supported, Port B is used for PTRS transmission; and if two PTRS ports are supported, Ports B and C are used for PTRS transmission.

In some embodiments, for four transmission layers, Set 10 {Ports (A, B, C, D) may be included in the second indication and indicated to the terminal device 120.

In one embodiment, the above plurality of sets (such as Sets 00-10) may be associated DMRS transmitted with one symbol. There may be a respective index for indicating each of the plurality of sets, and for different indications, the respective index may different.

For example, in case of DMRS configuration 1 associated with two symbols, up to 8 Ports (for example, Ports A, B, C, D, E, F, G and H) may be supported. In some embodiments, the 8 ports may be divided into a plurality of sets based on different assumptions related to RS transmission. For a determined number of RS transmission layers, at least one set of RS ports may be selected from plurality of sets and included in the second indication.

In some embodiments, for one transmission layer, the plurality of sets may include but not limited to: Set 11 {Port A; Port B; Port C; Port D; Port E; Port F; Port G; Port H}; Set 12 {Port A; Port B; Port E; Port F}; Set 13 {Port C; Port D; Port G; Port H} and so on. In one embodiment, at least one of the above plurality of sets may be included in the second indication and indicated to the terminal device 120. The above plurality of sets may be associated with different assumptions related to RS transmission respectively. In one embodiment, for the indices indicating the RS ports from Sets 00-03, and the indices indicating the RS ports from Set 11-13, the number of RS ports or transmission layers may be the same. Alternatively or in addition, for different indices, the number of RS symbols may be different. For example, for the indices indicating the RS ports from Set 00-03, one symbol for RS transmission may be assumed, and for the indices indicating the RS ports from Set 11-13, two symbols for RS transmission are assumed.

In one embodiment, for example, the assumption associated with Set 11 {Port A; Port B; Port C; Port D; Port E; Port F; Port G; Port H} may include that resources for data transmission and resources for transmitting DMRS cannot be multiplexed based on FDM, and p_DMRS=p_data+3 dB. Alternatively or in addition, in another embodiment, the assumptions associated with Set 12 {Port A; Port B; Port E; Port F} may include that resources for data transmission and resources for transmitting DMRS can be multiplexed based on FDM, and p_DMRS=p_data. Alternatively or in addition, in another embodiment, the assumption associated with Set 13 {Port C; Port D; Port G; Port H} may include that resources for data transmission and resources for transmitting DMRS cannot be multiplexed based on FDM, and p_DMRS=p_data+3 dB.

In some embodiments, for two transmission layers, the plurality of sets may include but not limited to: Set 14 {Ports (A, B); Ports (C, D); Ports (E, F); Ports (G, H)}; Set 15 {Ports (A, C); Ports (B, D); Ports (E, G); Ports (F, H)}; Set 16 {Ports (A, D); Ports (B, C); Ports (E, H); Ports (F, G)}; Set 17 {Ports (A, E); Ports (B, F); Ports (C, G); Ports (D, H)}; Set 18 {Ports (A, F); Ports (B, E); Ports (C, H); Ports (D, G)} and Set 19 {Ports (A, B); Ports (E, F)}. In one embodiment, at least one of the above plurality of sets may be included in the second indication and indicated to the terminal device 120. The above plurality of sets may be associated with different assumptions related to RS transmission respectively.

In one embodiment, for example, the assumptions associated with Set 14 {Ports (A, B); Ports (C, D); Ports (E, F); Ports (G, H)} may include that only multi-user scheduling is supported, and p_DMRS=p_data+3 dB. Alternatively or in addition, in another embodiment, the assumptions may include that resources for data transmission and resources for transmitting DMRS cannot be multiplexed based on FDM, and p_DMRS=p_data+3 dB. Alternatively or in addition, in another embodiment, the assumptions may include that the two transmission layers cannot be from different TRPs. Alternatively or in addition, in yet another embodiment, the assumptions may include that p_PTRS=p_DMRS+3 dB.

In one embodiment, for example, the assumptions associated with Set 15 {Ports (A, C); Ports (B, D); Ports (E, G); Ports (F, H)} may include that resources for data transmission and resources for transmitting DMRS cannot be multiplexed based on FDM, and p_DMRS=p_data+3 dB. Alternatively or in addition, in another embodiment, the assumptions may include that the two transmission layers can be from different TRPs. Alternatively or in addition, in yet another embodiment, the assumptions may include: Ports A and C are QCLed; Port A is used for transmitting PTRS; and p_PTRS=p_DMRS. Alternatively or in addition, in yet another embodiment, the assumptions may include: Ports A and C are not QCLed; Ports A and C are used for transmitting PTRS; and p_PTRS=p_DMRS.

In one embodiment, for example, the assumptions associated with Set 16 {Ports (A, D); Ports (B, C); Ports (E, H); Ports (F, G)} may include that resources for data transmission and resources for transmitting DMRS cannot be multiplexed based on FDM, and p_DMRS=p_data+3 dB. Alternatively or in addition, in another embodiment, the assumptions may include that the two transmission layers can be from different TRPs. Alternatively or in addition, in yet another embodiment, the assumptions may include: Ports A and D are QCLed; Port A is used for transmitting PTRS; and p_PTRS=p_DMRS. Alternatively or in addition, in yet another embodiment, the assumptions may include: Ports A and D are not QCLed; Ports A and D are used for transmitting PTRS; and p_PTRS=p_DMRS.

In one embodiment, for example, the assumptions associated with Set 19 {Ports (A, B); Ports (E, F)} may include: resources for data transmission and resources for transmitting DMRS are multiplexed based on FDM, and p_DMRS=p_data.

In some embodiments, there may be several kinds of PDSCH, for example, including at least one of the following: broadcast PDSCH, multicast PDSCH, PDSCH for paging, PDSCH for system information, PDSCH for remaining minimum system information and etc. The PDSCH may be transmitted with a DMRS port. In one embodiment, for the DMRS of the PDSCH, the configuration pattern of the front-loaded DMRS may be fixed as DMRS Configuration 1. In another embodiment, for the DMRS of the PDSCH, the configuration pattern of the front-loaded DMRS may be fixed as DMRS configuration 2. In this case, there may be no need to indicate the DMRS configuration pattern for the PDSCH. In one embodiment, for the DMRS of the PDSCH, the number of symbols of front-loaded DMRS may be fixed to be 1. In another embodiment, for the DMRS of the PDSCH, the number of symbols of front-loaded DMRS may be fixed to be 2. In this case, there may be no need to indicate the number of symbols for the DMRS for the PDSCH. In one embodiment, for the PDSCH, the additional DMRS besides the front-loaded DMRS may be always present.

In some embodiments, for the PDSCH, different DMRS information may be determined based on different parameters. For example, the DMRS information for the PDSCH may be indicated, for example, in PBCH, in remaining minimum system information, in system information block, or via higher layer signaling, such as signaling on RRC Layer or MAC layer and so on. In some embodiments, the DMRS information may include at least one of the following: the port index, the cyclic shift value, the comb offset value, the frequency location of the REs for DMRS in frequency domain, the TD-OCC value, the FD-OCC value and etc. In some embodiments, the parameter for determining the DMRS information may include at least one of the following: cell ID, TRP ID, frame index, sub-frame index, slot index, symbol index, or some other indication. In one embodiment, the DMRS information for the PDSCH may be fixed for a given cell or TRP, and the DMRS information for the PDSCH may be different for different cells or TRPs. For example, for different cells, the DMRS for the PDSCH may be mapped in different REs in frequency domain.

In one embodiment, the values of the parameters for determining the DMRS information may be divided into K subsets (that are subset 0, subset 1, . . . and subset K−1), where K is integer and K≥1, for example K=2 or 3. For different subsets, the DMRS information may be different.

In one embodiment, for example for subset 0, if the cell ID is even, the DMRS information may include at least one of the following: the cyclic shift value for the DMRS port is c0; the comb offset value for the DMRS port is b0; the TD-OCC value for the DMRS port is {1, 1}; the FD-OCC value for the DMRS port is {1, 1} and the RE location in frequency domain for the DMRS port is α0. For example, one RS port selected from {Port A, Port C, Port E, Port G} as shown in FIG. 5A or FIG. 5B may be indicated by the DMRS information. For another example, one RS port selected from {Port A, Port B, Port G, Port H} as shown in FIG. 7A or FIG. 7B may be indicated by the DMRS information. In another embodiment, for example for subset 1, if the cell ID is odd, the DMRS information may include at least one of the following: the cyclic shift value for the DMRS port is c1; the comb offset value for the DMRS port is b1; the TD-OCC value for the DMRS port is {1, −1}; the FD-OCC value for the DMRS port may be {1, −1}; and the RE location in frequency domain for the DMRS port may be α1. For example, one RS port selected from {Port B, Port D, Port F, Port H} as shown in FIG. 5A or FIG. 5B may be indicated by the DMRS information. For another example, one RS port selected from {Port C, Port D, Port I, Port J} as shown in FIG. 7A or FIG. 7B may be indicated by the DMRS information.

In one embodiment, for example for subset 0, if the cell ID carrier by Primary Synchronization Signal (PSS) $N_{ID}^2=0$ or the cell ID $N_{ID}^{cell}$ mod 3 equals to 0 (that is, $N_{ID}^{cell}$ mod 3=0), then the RE location in frequency domain for the DMRS port may be α0. For example, one RS port selected from {Port A, Port B, Port G, Port H} as shown in FIG. 7A or FIG. 7B may be indicated by the DMRS information. In another embodiment, for example for subset 1, if the cell ID carrier by PSS $N_{ID}^2=1$ or the cell ID mod 3 equals to 1 (that is, $N_{ID}^{cell}$ mod 3=1), then the RE location in frequency domain for the single DMRS port may be α1. For example, one RS port selected from {Port C, Port D, Port I, Port J} as shown in FIG. 7A or FIG. 7B may be indicated by the DMRS information. In yet another embodiment, for example for subset 2, if the cell ID carrier by PSS $N_{ID}^2=2$ or the cell ID mod 3 equals to 2 (that is, $N_{ID}^{cell}$ mod 3=2), then the RE location in frequency domain for the DMRS port may be α2. For example, one RS port selected from {Port E, Port F, Port K, Port L} as shown in FIG. 7A or FIG. 7B may be indicated by the DMRS information.

In some embodiments, for one cell, the DMRS port for the PDSCH may be Port A as shown in FIG. 5A, FIG. 5B, FIG. 7A or FIG. 7B; while for another cell, the DMRS port for the PDSCH may be Port B as shown in FIG. 5A or FIG. 5B, or Port C as shown in FIG. 7A or FIG. 7B. In some embodiments, for one cell, the DMRS port for the PDSCH may be Port A as shown in FIG. 7A or FIG. 7B; for another cell the DMRS port for the PDSCH may be Port C as shown in FIG. 7A or FIG. 7B; and for yet another cell, the DMRS port for the PDSCH may be Port E as shown in FIG. 7A or FIG. 7B.

In some embodiments, for the PDSCH, the DMRS and data may be not multiplexed in frequency domain, or the multiplexing of DMRS and data based on FDM may not be supported. In some embodiments, for the PDSCH, the unused REs in the DMRS symbol may be kept unused. For example, the power on the unused REs may be allocated to the REs occupied by DMRS. In some embodiments, for the PDSCH, the power offset between DMRS and data may be fixed, for example, p_DMRS=p_data+3 dB.

In some embodiments, for the PDSCH, the DMRS and data may be multiplexed in frequency domain, or the multiplexing of DMRS and data based on FDM may be supported. In some embodiments, for the PDSCH, the unused REs in the DMRS symbol may be used for PDSCH transmission. In some embodiments, for the PDSCH, the power offset between DMRS and data may be fixed, for example, p_DMRS=p_data.

It should be understood that the above examples are only for the purpose of illustration without suggesting any limitations to the present disclosure. The present disclosure is not necessarily limited to the above examples as illustrated above. Rather, more features and/or examples can be conceived by those skilled in the art in view of the teachings of the present disclosure.

Additionally, in some cases, an additional DMRS besides the front-loaded DMRS can be configured. In this case, in some embodiments, there may be up to 4 RS ports in one symbol for DMRS Configuration 1, and/or up to 6 RS ports in one symbol for DMRS Configuration 2. In some embodiments, multiple user scheduling may not be supported in this case. Alternatively or in addition, in this case, in some embodiments, resources for transmitting DMRS and resources for transmitting data may not be multiplexed based on FDM. Alternatively or in addition, the transmission power for DMRS may be boosted. In some embodiments, there may be no PTRS being transmitted in this case. In some embodiments, when additional DMRS besides the front-loaded DMRS is configured, some of the indices in DCI may not be used, or the number of indices in DCI may be reduced, or the number of bits in DCI may be reduced.

In one embodiment, for one PDSCH, if all of the transmission layers are from separate TRPs or cells, it may be assumed that no PTRS is associated with any of the DMRS ports for the PDSCH.

In some embodiments, the configuration of DMRS configuration pattern may be conducted per sub-band, per bandwidth part and/or per carrier component.

Figure 8:
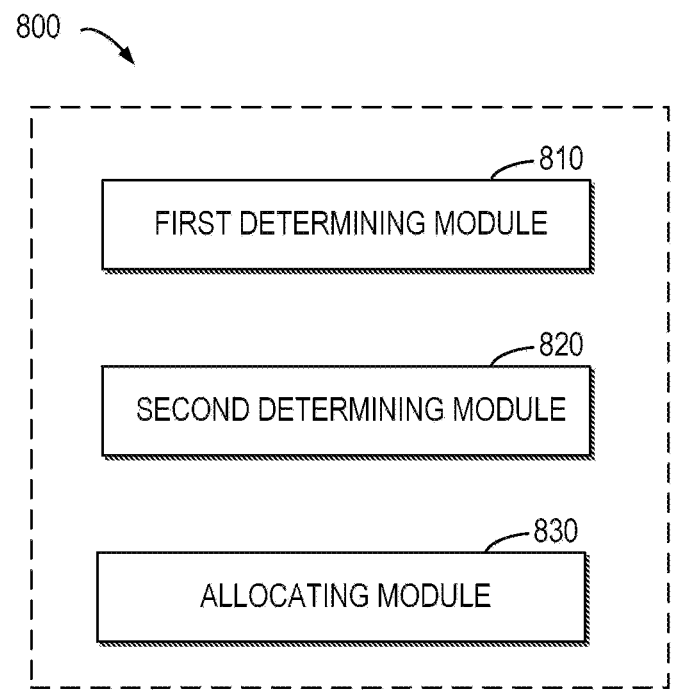
FIG. 8 is a block diagram of a network device in accordance with some embodiments of the present disclosure.

FIG. 8 shows a block diagram of an apparatus 800 in accordance with some embodiments of the present disclosure. The apparatus 800 can be considered as an example implementation of the network device 110 as shown in FIG. 1. As shown, the apparatus 800 may include a first determining module 810, configured to determine a plurality of reference signal (RS) ports to be used for RS transmission based on at least one of different RS configuration patterns, different port multiplexing types and different number of symbols to be used for RS transmission, each of the plurality of RS ports being indexed with a respective port index and at least two of the plurality of RS ports sharing a same port index. The apparatus 800 may also include a second determining module 820 configured to determine a plurality of RS configurations at least based on the plurality of RS ports. In addition, the apparatus 800 may also include an allocating module 830, configured to allocate at least one RS configuration from the plurality of RS configurations for a terminal device served by the network device, the at least one RS configuration indicating at least one RS port to be used for RS transmission.

In some embodiments, the plurality of RS ports include a first RS port and a second RS port associated with a same RS configuration pattern, and determining the plurality of RS ports comprises: determining the first and second RS ports based on the same RS configuration pattern, such that the first RS port is associated with a first number of symbols to be used for RS transmission, the second RS port is associated with a second number of symbols to be used for RS transmission, and the first and second RS ports share a same port index.

In some embodiments, the first RS port is associated with first information indicating a first port multiplexing type, the second RS port is associated with second information indicating a second port multiplexing type, and the first information is at least partially the same as the second information.

In some embodiments, each of the first and second information includes at least one of the following: a respective value indicating resource allocation in frequency domain, a respective Orthogonal Covering Code (OCC), a respective cycle shift (CS) value and a respective comb offset value.

In some embodiments, the plurality of RS ports include a third RS port associated with a CS value, and determining the plurality of RS configurations comprises: determining, at least based on the CS value, a RS sequence to be transmitted with the third RS port; and determining, based on the third RS port and the RS sequence, at least one of the plurality of RS configurations.

In some embodiments, determining the plurality of RS configurations comprises: dividing the plurality of RS ports into a plurality of sets, each of the plurality of sets being associated with at least one assumption related to RS transmission; and determining the plurality of RS configurations based on the plurality of sets.

In some embodiments, the at least one assumption is directed to at least one of the following: information on user scheduling, power offset associated with RS transmission, information on RS transmission layers, information on QCL and a relationship between different types of RSs.

In some embodiments, allocating the at least one RS configuration comprises: selecting, from the plurality of RS configurations, the at least one RS configuration for the terminal device, the at least one RS configuration indicating at least one set of RS ports from the plurality of sets; and indicating the at least one RS configuration to the terminal device.

In some embodiments, the at least one set of RS ports are associated with a RS configuration pattern, and indicating the at least one RS configuration comprises: transmitting third information on the RS configuration pattern to the terminal device via high layer signaling; and transmitting fourth information on the at least one set of RS ports to the terminal device via high layer signaling and/or dynamic signaling.

In some embodiments, the at least one set of RS ports are indexed with at least one index value, and the fourth information includes the at least one index value.

In some embodiments, the RS is a DMRS.

For the sake of clarity, FIG. 8 does not illustrate some optional modules of the apparatus 800. However, it should be understood that various features as described with reference to FIGS. 1-7B are likewise applicable to the apparatus 800. Moreover, respective modules of the apparatus 800 may be hardware modules or software modules. For example, in some embodiments, the apparatus 800 may be implemented partially or completely by software and/or firmware, e.g., implemented as a computer program product embodied on the computer-readable medium. Alternatively, or in addition, the apparatus 800 may be partially or completely implemented based on hardware, e.g., implemented as an integrated circuit (IC), an application-specific integrated circuit (ASIC), a system on chip (SOC), a field programmable gate array (FPGA) and the like. The scope of the present disclosure is not limited in this aspect.

Figure 9:
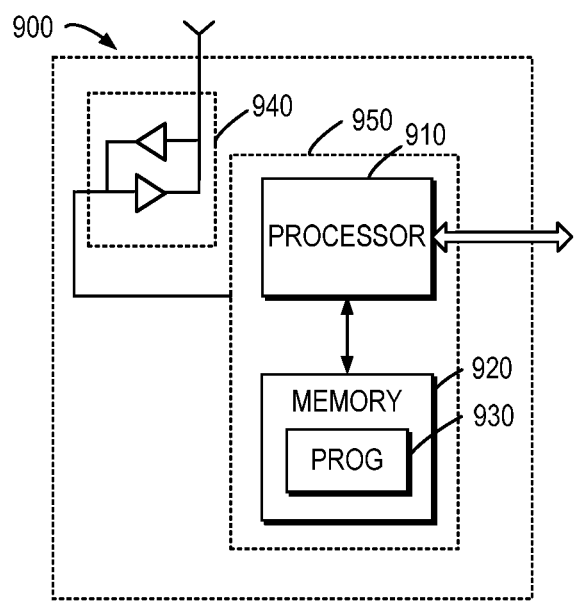
FIG. 9 is a simplified block diagram of a device that is suitable for implementing embodiments of the present disclosure.

FIG. 9 is a simplified block diagram of a device 900 that is suitable for implementing embodiments of the present disclosure. The device 900 can be considered as a further example implementation of the network device 110 as shown in FIG. 1. Accordingly, the device 900 can be implemented at or as at least a part of the network device 110.

As shown, the device 900 includes a processor 910, a memory 920 coupled to the processor 910, a suitable transmitter (TX) and receiver (RX) 940 coupled to the processor 910, and a communication interface coupled to the TX/RX 940. The memory 910 stores at least a part of a program 930. The TX/RX 940 is for bidirectional communications. The TX/RX 940 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 930 is assumed to include program instructions that, when executed by the associated processor 910, enable the device 900 to operate in accordance with the embodiments of the present disclosure, as discussed herein with reference to FIGS. 1 to 8. The embodiments herein may be implemented by computer software executable by the processor 910 of the device 900, or by hardware, or by a combination of software and hardware. The processor 910 may be configured to implement various embodiments of the present disclosure. Furthermore, a combination of the processor 910 and memory 910 may form processing means 950 adapted to implement various embodiments of the present disclosure.

The memory 910 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 910 is shown in the device 900, there may be several physically distinct memory modules in the device 900. The processor 910 may be of any type suitable to the local technical network, and may include one or more of general purpose computers, special purpose computers, microprocessors, digital signal processors (DSPs) and processors based on multicore processor architecture, as non-limiting examples. The device 900 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to any of FIGS. 1 to 7B. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A terminal comprising a processor configured to:
generate DMRS (DeModulation Reference Signal) sequences for a DMRS port in adjacent 2 symbols; and
transmit, to a network device, the DMRS sequences using the DMRS port, wherein
the DMRS sequences for the DMRS port in the adjacent 2 symbols are same.

2. The terminal according to claim 1, wherein
the complex values of the DMRS sequences for the DMRS port in the adjacent 2 symbols are same.

3. The terminal according to claim 1, wherein
the DMRS sequences are generated based on a cyclic shift parameter.

4. A network device comprising a processor configured to:
receive, from a terminal, DMRS (DeModulation Reference Signal) sequences generated for a DMRS port in adjacent 2 symbols; and
detect the DMRS sequences, wherein
the DMRS sequences for the DMRS port in the adjacent 2 symbols are same.

5. The network device according to claim 4, wherein
the complex values of the DMRS sequences for the DMRS port in the adjacent 2 symbols are same.

6. The network device according to claim 4, wherein
the DMRS sequences are generated based on a cyclic shift parameter.

7. A method comprising:
generating DMRS (DeModulation Reference Signal) sequences for a DMRS port in adjacent 2 symbols; and
transmitting the DMRS sequences using the DMRS port, wherein
the DMRS sequences for the DMRS port in the adjacent 2 symbols are same.

8. The method according to claim 7, wherein
the complex values of the DMRS sequences for the DMRS port in the adjacent 2 symbols are same.

9. The method according to claim 7, wherein
the DMRS sequences are generated based on a cyclic shift parameter.

10. A method comprising:
receiving DMRS (DeModulation Reference Signal) sequences generated for a DMRS port in adjacent 2 symbols; and
detecting the DMRS sequences, wherein
the DMRS sequences for the DMRS port in the adjacent 2 symbols are same.

11. The method according to claim 10, wherein
the complex values of the DMRS sequences for the DMRS port in the adjacent 2 symbols are same.

12. The method according to claim 10, wherein
the DMRS sequences are generated based on a cyclic shift parameter.

* * * * *